United States Patent
Huang et al.

(10) Patent No.: US 11,483,043 B2
(45) Date of Patent: Oct. 25, 2022

(54) DROPPING CHANNEL STATE INFORMATION DURING DISCONTINUOUS RECEPTION

(71) Applicant: QUALCOMM Incorporated, San Diego, CA (US)

(72) Inventors: Yi Huang, San Diego, CA (US); Pranay Sudeep Rungta, San Diego, CA (US); Peter Gaal, San Diego, CA (US); Wanshi Chen, San Diego, CA (US); Linhai He, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 16/940,775

(22) Filed: Jul. 28, 2020

(65) Prior Publication Data

US 2021/0050897 A1 Feb. 18, 2021

Related U.S. Application Data

(60) Provisional application No. 62/887,399, filed on Aug. 15, 2019.

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0055* (2013.01); *H04W 72/0446* (2013.01); *H04W 76/28* (2018.02)

(58) Field of Classification Search
CPC .............. H04B 7/0626; H04L 5/0055; H04W 72/0446; H04W 76/28; H04W 72/085; H04W 72/0413; H04W 24/10
See application file for complete search history.

(56) References Cited

U.S. PATENT DOCUMENTS

2021/0099902 A1* 4/2021 Takeda .................. H04W 24/10

FOREIGN PATENT DOCUMENTS

CN 112217618 A * 1/2021
KR 20210011282 A * 2/2001

OTHER PUBLICATIONS

Ericsson: "On UCI Multiplexing on PUSCH", 3GPP Draft; 3GPP TSG-RAN WG1 #92bis, R1-1805185, 3rd Generation Partnership Project (3GPP). Mobile Competence Centre; 650. Route Des Lucioles ; F-06921 Sophia-Antipolis Cedex; France, vol. RAN WG1. No. Sanya, China; Apr. 16, 2018-Apr. 20, 2018, Apr. 15, 2018 (Apr. 15, 2018), XP051427434, 12 Pages, Retrieved from the Internet: URL:http://www.3gpp.org/ftp/Meetings%5F3GPP%5FSYNC/RAN1/Docs/ [retrieved on Apr. 15, 2018], section 5 and 6.
(Continued)

*Primary Examiner* — Vinncelas Louis
(74) *Attorney, Agent, or Firm* — Dalei Dong; Holland & Hart LLP

(57) ABSTRACT

Methods, systems, and devices for wireless communications are described. A user equipment (UE) may refrain from transmitting channel state information (CSI) if the CSI is configured to be transmitted during an inactive discontinuous reception (DRX) duration. The UE may determine that the CSI is configured to be transmitted during the inactive DRX duration based on determining that some or all of the configured time slot for transmitting the CSI occurs while the UE is operating in the inactive DRX duration. The UE
(Continued)

may transmit feedback information, such as an acknowledgement (ACK), whether or not the UE drops the CSI.

29 Claims, 19 Drawing Sheets

(51) Int. Cl.
*H04W 72/04* (2009.01)
*H04W 76/28* (2018.01)

(56) References Cited

OTHER PUBLICATIONS

International Search Report and Written Opinion—PCT/US2020/044041—ISA/EPO—dated Nov. 2, 2020.

LG Electronics Inc: "CSI Reporting for DRX", 3GPP Draft; 3GPP TSG-RAN2 NR AH 1807, R2-1810167 CSI Reporting for DRX, 3rd Generation Partnership Project (3GPP), Mobile Competence Centre, 650, Route Des Lucioles, F-06921, Sophia-Antipolis Cedex, France, vol. RAN WG2, No. Montreal, Canada, Jul. 2, 2018-Jul. 6, 2018, Jul. 1, 2018 (Jul. 1, 2018), XP051467376, pp. 1-4, Retrieved from the Internet: URL: http://www.3gpp.org/ftp/Meetings%5F3GPP%5FSYNC/RAN2/Docs, [retrieved on Jul. 1, 2018], Section 2.2 and 2.3.

Qualcomm Inc, et al., "Clarification on CSI Reporting in C-DRX", 3GPP Draft; 3GPP TSG-RAN WG2 Meeting #106, R2-1906711 Clarification on CSI Reporting in C-DRX, 3rd Generation Partnership Project (3GPP), Mobile Competence Centre; 650, Route Des Lucioles; F-06921 Sophia-Antipolis Cedex; France, vol. RAN WG2, No. Reno, USA; May 13, 2019-May 17, 2019, May 13, 2019 (May 13, 2019), XP051730168, 6 pages, Retrieved from the Internet: URL: http://www.3gpp.org/ftp/Meetings%5F3GPP%5FSYNC/RAN2/Docs/R2%2D1906711%2Ezip, [retrieved on May 13, 2019], p. 2.

* cited by examiner

DROPPING CHANNEL STATE INFORMATION DURING DISCONTINUOUS RECEPTION

CROSS REFERENCE

The present application for patent claims the benefit of U.S. Provisional Patent Application No. 62/887,399 by HUANG, et al., entitled "DROPPING CHANNEL STATE INFORMATION DURING DISCONTINUOUS RECEPTION," filed Aug. 15, 2019, assigned to the assignee hereof, and which is expressly incorporated by reference herein.

TECHNICAL FIELD

The following relates generally to wireless communications, and more specifically to dropping channel state information during discontinuous reception.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). For example, an LTE or NR base station may provide a mobile device access to the internet via the wireless network.

A UE may transmit control or status information to the base station. For example, a UE may transmit channel state information (CSI) indicating the quality of communication on a channel. A UE may also transmit feedback information indicating whether a signal was successfully received at the UE. In some examples, a UE may operate in a discontinuous reception (DRX) mode in which the UE may be active over one or more durations and inactive over one or more other durations. If the UE is operating over an inactive DRX duration, the UE may refrain from transmitting or receiving some types of information (such as CSI and feedback information) to conserve power.

SUMMARY

The described techniques relate to improved methods, systems, devices, and apparatuses that support dropping or reporting information, such as channel state information (CSI), during discontinuous reception (DRX) mode operation. It may be desirable, in some examples, for a user equipment (UE) to transmit some types of information, such as feedback information, to a base station if the UE is operating in an inactive DRX duration, which may present a challenge if the feedback information is multiplexed with control information. Generally, the described techniques relate to determinations about dropping a transmission of CSI if a UE is operating in an inactive DRX duration while supporting transmission of feedback information, such as an acknowledgement (ACK) of a signal received at the UE. For example, a UE may determine whether resources for transmitting the CSI are in a slot that is within an inactive DRX duration. If so, the UE may drop the configured transmission of the CSI, and may transmit the ACK during the inactive DRX duration. The UE may determine whether the resources for transmitting the CSI are in the slot based on a starting symbol, or on an ending symbol, or based on some other symbol or symbols of the resources. In some examples, the UE may determine whether radio resource control (RRC) configured physical uplink control channel (PUCCH) resources allocated for transmitting the CSI are in a slot that is within the inactive DRX duration. In some examples, the UE may select new PUCCH resources for transmitting the CSI (such as based on an indication of new PUCCH resources received at the UE), and may determine whether the new PUCCH resources are in a slot that is within the inactive DRX duration. Such techniques may enable a UE to provide ACK/NACK feedback during DRX operation in cases where CSI may be dropped, and may provide backward compatibility with earlier wireless communication systems.

One innovative aspect of the subject matter described in this disclosure can be implemented in a method for wireless communication. The method includes receiving an indication of first resources associated with a physical uplink control channel for transmitting channel state information in a slot to a base station; determining whether one or more symbols of the first resources associated with the physical uplink control channel in the slot are included in a portion of the slot within an inactive discontinuous reception duration for the UE; determining channel state information; and dropping a configured transmission of the channel state information in the slot based at least in part on determining that the one or more symbols of the first resources associated with the physical uplink control channel in the slot are included in the portion of the slot that includes the inactive discontinuous reception duration for the UE.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive an indication of first resources associated with a physical uplink control channel for transmitting channel state information in a slot to a base station; determine whether one or more symbols of the first resources associated with the physical uplink control channel in the slot are included in a portion of the slot within an inactive discontinuous reception duration for the UE; determine channel state information; and drop a configured transmission of the channel state information in the slot based at least in part on determining that the one or more symbols of the first resources associated with the physical uplink control channel in the slot are included in the portion of the slot that includes the inactive discontinuous reception duration for the UE.

Another innovative aspect of the subject matter described in this disclosure can be implemented in an apparatus for wireless communications at a UE. The apparatus may include means for receiving an indication of first resources associated with a physical uplink control channel for transmitting channel state information in a slot to a base station; means for determining whether one or more symbols of the first resources associated with the physical uplink control channel in the slot are included in a portion of the slot within an inactive discontinuous reception duration for the UE; means for determining channel state information; and means for dropping a configured transmission of the channel state information in the slot based at least in part on determining that the one or more symbols of the first resources associated with the physical uplink control channel in the slot are included in the portion of the slot comprising the inactive discontinuous reception duration for the UE Another innovative aspect of the subject matter described in this disclosure can be implemented in a non-transitory computer-readable medium storing code for wireless communications at a UE. The code may include instructions executable by a processor to receive an indication of first resources associated with a physical uplink control channel for transmitting channel state information in a slot to a base station; determine whether one or more symbols of the first resources associated with the physical uplink control channel in the slot are included in a portion of the slot within an inactive discontinuous reception duration for the UE; determine channel state information; and drop a configured transmission of the channel state information in the slot based at least in part on determining that the one or more symbols of the first resources associated with the physical uplink control channel in the slot are included in the portion of the slot that includes the inactive discontinuous reception duration for the UE.

Another innovative aspect of the subject matter described in this disclosure can be implemented in a method for wireless communications at a UE. The method may include determining first resources associated with a physical uplink control channel for transmitting channel state information and an acknowledgment associated with a signal received by the UE in a slot to a base station; selecting, based on determining the first resources, second resources associated with the physical uplink control channel in the slot for transmitting the channel state information and the acknowledgement; determining that the second resources associated with the physical uplink control channel overlap with third resources associated with a physical uplink shared channel; determining, based on determining that the second resources associated with the physical uplink control channel overlap with the third resources associated with the physical uplink shared channel, whether one or more symbols of the second resources associated with the physical uplink control channel in the slot are included in a portion of the slot within an inactive discontinuous reception duration for the UE; selecting fourth resources for transmitting the acknowledgement based on determining whether the one or more symbols of the second resources associated with the physical uplink control channel in the slot are included in the portion of the slot within the inactive discontinuous reception duration for the UE, the fourth resources including the second resources or the third resources; multiplexing, over the fourth resources, the acknowledgement with data for transmitting on the physical uplink shared channel; and transmitting, to the base station, the multiplexed acknowledgement and data using the fourth resources.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to determine first resources associated with a physical uplink control channel for transmitting channel state information and an acknowledgment associated with a signal received by the UE in a slot to a base station; select, based on determining the first resources, second resources associated with the physical uplink control channel in the slot for transmitting the channel state information and the acknowledgement; determine that the second resources associated with the physical uplink control channel overlap with third resources associated with a physical uplink shared channel; determine, based on determining that the second resources associated with the physical uplink control channel overlap with the third resources associated with the physical uplink shared channel, whether one or more symbols of the second resources associated with the physical uplink control channel in the slot are included in a portion of the slot within an inactive discontinuous reception duration for the UE; select fourth resources for transmitting the acknowledgement based on determining whether the one or more symbols of the second resources associated with the physical uplink control channel in the slot are included in the portion of the slot within the inactive discontinuous reception duration for the UE, the fourth resources including the second resources or the third resources; multiplex, over the fourth resources, the acknowledgement with data for transmitting on the physical uplink shared channel; and transmit, to the base station, the multiplexed acknowledgement and data using the fourth resources.

Another innovative aspect of the subject matter described in this disclosure can be implemented in an apparatus for wireless communications at a UE. The apparatus may include means for determining first resources associated with a physical uplink control channel for transmitting channel state information and an acknowledgment associated with a signal received by the UE in a slot to a base station means for selecting, based on determining the first resources, second resources associated with the physical uplink control channel in the slot for transmitting the channel state information and the acknowledgement; means for determining that the second resources associated with the physical uplink control channel overlap with third resources associated with a physical uplink shared channel; means for determining, based on determining that the second resources associated with the physical uplink control channel overlap with the third resources associated with the physical uplink shared channel, whether one or more symbols of the second resources associated with the physical uplink control channel in the slot are included in a portion of the slot within an inactive discontinuous reception duration for the UE; means for selecting fourth resources for transmitting the acknowledgement based on determining whether the one or more symbols of the second resources associated with the physical uplink control channel in the slot are included in the portion of the slot within the inactive discontinuous reception duration for the UE, the fourth resources including the second resources or the third resources; means for multiplexing, over the fourth resources, the acknowledgement with data for transmitting on the physical uplink shared channel, and transmitting, to the base station, the multiplexed acknowledgement and data using the fourth resources.

Another innovative aspect of the subject matter described in this disclosure can be implemented in a non-transitory computer-readable medium storing code for wireless communications at a UE. The code may include instructions executable by a processor to determine first resources associated with a physical uplink control channel for transmitting channel state information and an acknowledgment associated with a signal received by the UE in a slot to a base station; select, based on determining the first resources, second resources associated with the physical uplink control channel in the slot for transmitting the channel state information and the acknowledgement; determine that the second resources associated with the physical uplink control channel overlap with third resources associated with a physical uplink shared channel; determine, based on determining that the second resources associated with the physical uplink control channel overlap with the third resources associated with the physical uplink shared channel, whether one or more symbols of the second resources associated with the physical uplink control channel in the slot are included in a portion of the slot within an inactive discontinuous reception duration for the UE; select fourth resources for transmitting the acknowledgement based on determining whether the one or more symbols of the second resources associated with the physical uplink control channel in the slot are included in the portion of the slot within the inactive discontinuous reception duration for the UE, the fourth resources including the second resources or the third resources; multiplex, over the fourth resources, the acknowledgement with data for transmitting on the physical uplink shared channel; and transmit, to the base station, the multiplexed acknowledgement and data using the fourth resources.

Another innovative aspect of the subject matter described in this disclosure can be implemented in a method for wireless communications at a UE. The method may include multiplexing channel state information over first resources of a physical uplink shared channel for transmitting data to a base station in a slot based on determining that second resources of a physical uplink control channel for transmitting the channel state information overlap with the first resources; determining whether at least a portion of the slot includes an inactive discontinuous reception duration for the UE; determining whether additional information is multiplexed on the physical uplink shared channel based on determining that at least the portion of the slot includes the inactive discontinuous reception duration for the UE; and transmitting the multiplexed channel state information and the additional information on the first resources of the physical uplink shared channel based on determining that the channel state information is multiplexed with the additional information.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to multiplex channel state information over first resources of a physical uplink shared channel for transmitting data to a base station in a slot based on determining that second resources of a physical uplink control channel for transmitting the channel state information overlap with the first resources; determine whether at least a portion of the slot includes an inactive discontinuous reception duration for the UE; determine whether additional information is multiplexed on the physical uplink shared channel based on determining that at least the portion of the slot includes the inactive discontinuous reception duration for the UE; and transmit the multiplexed channel state information and the additional information on the first resources of the physical uplink shared channel based on determining that the channel state information is multiplexed with the additional information.

Another innovative aspect of the subject matter described in this disclosure can be implemented in an apparatus for wireless communications at a UE. The apparatus may include means for multiplexing channel state information over first resources of a physical uplink shared channel for transmitting data to a base station in a slot based on determining that second resources of a physical uplink control channel for transmitting the channel state information overlap with the first resources; means for determining whether at least a portion of the slot includes an inactive discontinuous reception duration for the UE, determining whether additional information is multiplexed on the physical uplink shared channel based on determining that at least the portion of the slot includes the inactive discontinuous reception duration for the UE; and means for transmitting the multiplexed channel state information and the additional information on the first resources of the physical uplink shared channel based on determining that the channel state information is multiplexed with the additional information.

Another innovative aspect of the subject matter described in this disclosure can be implemented in a non-transitory computer-readable medium storing code for wireless communications at a UE. The code may include instructions executable by a processor to multiplex channel state information over first resources of a physical uplink shared channel for transmitting data to a base station in a slot based on determining that second resources of a physical uplink control channel for transmitting the channel state information overlap with the first resources; determine whether at least a portion of the slot includes an inactive discontinuous reception duration for the UE, determine whether additional information is multiplexed on the physical uplink shared channel based on determining that at least the portion of the slot includes the inactive discontinuous reception duration for the UE; and transmit the multiplexed channel state information and the additional information on the first resources of the physical uplink shared channel based on determining that the channel state information is multiplexed with the additional information.

DETAILED DESCRIPTION

Figure 1:
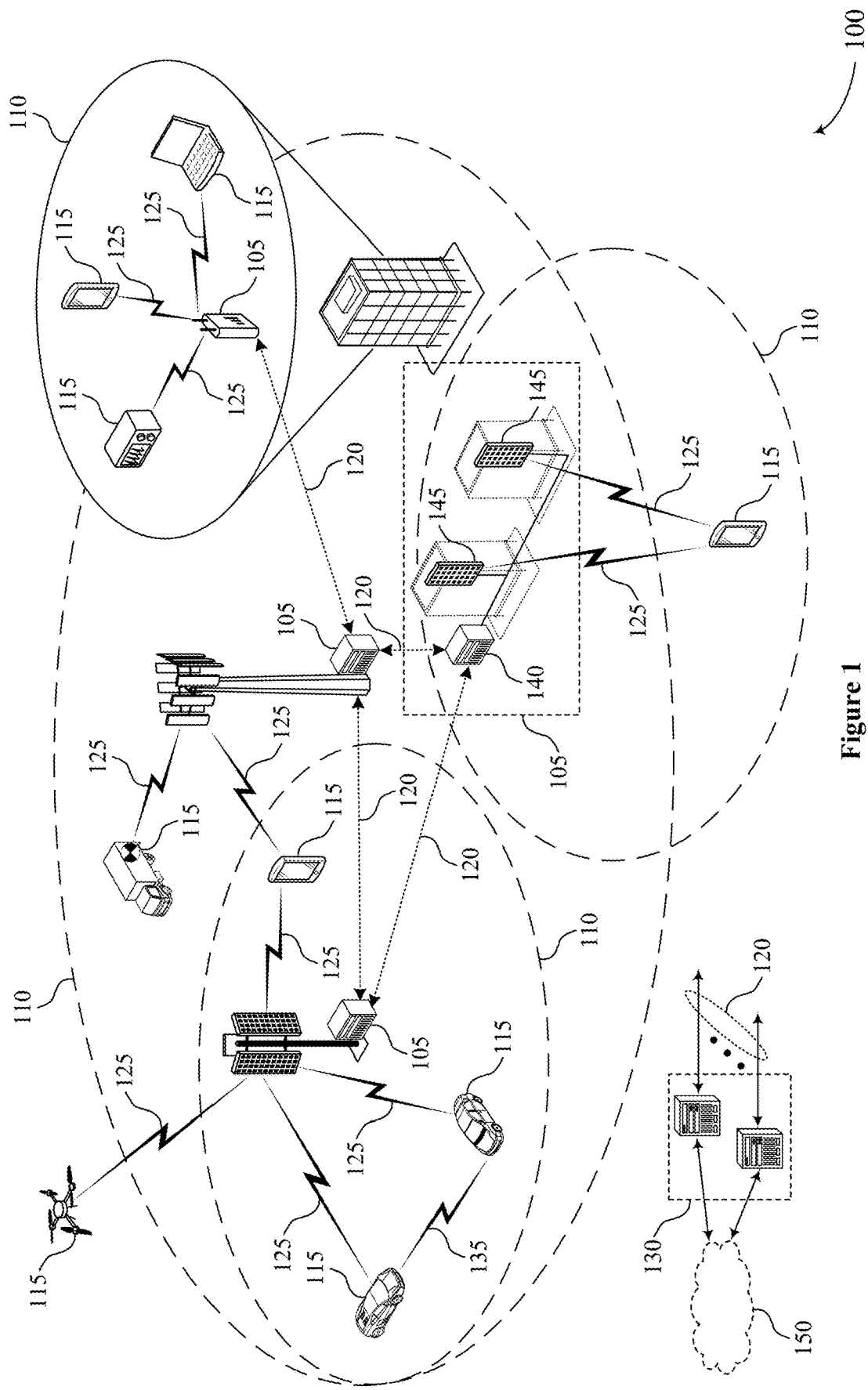
FIG. 1 illustrates an example of a wireless communication system that supports dropping channel state information during discontinuous reception in accordance with aspects of the present disclosure.

A user equipment (UE) may be configured to report channel state information (CSI) to a base station at one or more configured transmission times (for example, transmission times that may be semi-statically configured by radio resource control (RRC) signaling), and may also be configured to transmit feedback information, such as an acknowledgement (ACK) or non-acknowledgement (NACK) of a signal that is received by the UE. In some examples, a UE may be configured for concurrent or simultaneous transmission of CSI and feedback information, in which case the UE may multiplex the CSI and an ACK/NACK, for example, on the same resources of a physical uplink control channel (PUCCH) and may transmit the multiplexed CSI and ACK/NACK within a configured time slot. Such concurrent or simultaneous transmission of CSI and feedback information may create challenges, however, in the context of operating the UE in a discontinuous reception (DRX) mode.

If a UE operates in a DRX mode, the UE may transition, for example, periodically transition, between an active mode and an inactive, low-power mode in which the UE may refrain from transmitting or receiving some types of information. That is, if the UE is in an active DRX duration, the UE may be configured to transmit and receive information, and if the UE is in an inactive DRX duration, the UE may refrain from monitoring for signals from the base station and may also refrain from transmitting or receiving some types of information.

In some examples, a UE may be configured to refrain from transmitting the CSI on the PUCCH resources (that is, to drop the transmission of the CSI) if the CSI is configured to be transmitted during an inactive DRX duration. The UE may determine that the CSI is configured to be transmitted during the inactive DRX duration by determining that some or all of the configured time slot for transmitting the CSI occurs while the UE is operating in the inactive DRX duration. Because the UE may be configured to multiplex an ACK with the CSI, the UE may also unfortunately drop transmission of the ACK that should otherwise be transmitted, which may be undesirable and lead to additional performance problems. New techniques for determining whether to transmit the CSI and the feedback information (such as an ACK/NACK) during inactive DRX durations are needed to avoid dropping feedback information unnecessarily, for example, to determine if the CSI may be appropriately dropped.

In some examples, when a UE is operating in an inactive DRX duration, the UE may be configured to determine whether PUCCH resources allocated for transmission of the CSI overlap with physical uplink shared channel (PUSCH) resources that may be allocated to the UE for transmitting data to the base station. In some examples, if the PUCCH resources overlap with the PUSCH resources, the UE may multiplex the CSI over the PUSCH resources (for example, "piggyback" the CSI on PUSCH resources) and transmit the multiplexed CSI on the PUSCH resources rather than transmitting the CSI on the original (for example, RRC-configured) PUCCH resources. In some examples, the UE may transmit the piggy-backed CSI on the PUSCH resources even during DRX inactive periods. Similarly, if a UE is configured to multiplex CSI and ACK/NACK information, the UE may determine whether PUCCH resources allocated for transmission of the multiplexed CSI and ACK/NACK information overlap with the PUSCH resources, and may piggyback the CSI and the ACK/NACK on the PUSCH resources for transmission. In some examples, multiplexing the CSI with an ACK/NACK may change the PUCCH resources allocated for transmitting the CSI and/or ACK/NACK. In either of such examples, the new PUCCH resources identified by the UE to transmit the CSI and the ACK may be different than the RRC-configured PUCCH resources that were originally allocated to the UE for transmitting the CSI and the ACK. The new PUCCH resources may or may not overlap with the PUSCH resources.

In some examples, a wireless communication system may be implemented by multiple layers of functionality. Such layers may include a medium access control (MAC) layer, a physical (PHY) layer, an RRC layer, and other layers. In some examples, the RRC layer may configure PUCCH resources for the UE to use for transmitting the CSI and the ACK, and the PHY layer may be responsible for multiplexing the CSI and the ACK on the resources for transmission, which may be the RRC-configured PUCCH resources, new PUCCH resources, or the PUSCH resources. The MAC layer may be responsible for determining whether to drop the transmission of the CSI during a DRX operation based on whether the resources to be used for transmitting the CSI and the ACK are in a slot that is within an inactive DRX duration (for example, in a slot in which at least part of the slot is within an inactive DRX duration). The MAC layer, however, may not have access to information about the new resources (such as the PUSCH resources or the new PUCCH resources) that may be used by the PHY layer for multiplexing uplink control information (UCI) such as the CSI and the ACK/NACK. Thus, the MAC layer may be unable to determine whether the new resources are in a slot that is within an inactive DRX duration or whether the new resources overlap with the PUSCH resources, and the UE may need to use alternative approaches for determining whether to drop transmission of the CSI during an inactive DRX duration.

In some other examples, the UE may determine whether to drop the transmission of the CSI based on whether one or more symbols of the RRC-configured PUCCH resources are in a slot that is within an inactive DRX duration. That is, the UE may determine whether to drop the transmission of the CSI based on the original PUCCH resources, which may be configured by RRC signaling, without considering the new PUCCH resources after multiplexing the UCI and without considering the PUSCH resources. For example, the UE may determine whether one or more of the symbols of the RRC-configured PUCCH resources for transmitting the CSI, such as the first or last symbol, are configured to be transmitted during an inactive DRX duration (for example, in a portion of the slot that includes the inactive DRX duration), or whether the entire slot falls within (for example, includes) the inactive DRX duration.

In some other examples, the UE may determine whether to drop the transmission of the CSI based on whether one or more symbols of the new PUCCH resources or the PUSCH resources are in a slot that is within an inactive DRX duration in a similar manner as described above with respect to the RRC-configured PUCCH resources.

Techniques provided herein may enhance the efficiency and accuracy of wireless communications systems by enabling a UE to determine whether to transmit the CSI during DRX operation, and to transmit feedback information during an inactive DRX duration even if the UE drops the transmission of the CSI. Such techniques may enable backward compatibility with previous wireless communication systems while resolving ambiguity regarding transmission of CSI and ACK/NACK feedback during inactive DRX durations. (For simplicity, ACK/NACK feedback may be referred to herein as an ACK in some cases.)

Aspects of the disclosure are initially described in the context of a wireless communications system. Example wireless communications systems, DRX timings, and process flows implementing the discussed techniques are then described. Aspects of the disclosure are further illustrated by and described with reference to apparatus diagrams, system diagrams, and flowcharts that relate to dropping channel state information during discontinuous reception.

FIG. 1 illustrates an example of a wireless communications system 100 that supports dropping channel state information during discontinuous reception in accordance with aspects of the present disclosure. The wireless communications system 100 may include one or more base stations 105 (such as base stations or access nodes), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, base stations 105, or network equipment (such as core network nodes, relay devices, or other network equipment), as shown in FIG. 1.

The base stations 105 may communicate with the core network 130, or with one another, or both. For example, the base stations 105 may interface with the core network 130 through one or more backhaul links 120 (such as via an S1, N2, N3, or other interface). The base stations 105 may communicate with one another over the backhaul links 120 (such as via an X2, Xn, or other interface) either directly (such as directly between base stations 105), or indirectly (such as via the core network 130), or both.

One or more of the base stations 105 described herein may include or may be referred to by a person of ordinary skill in the art as a base transceiver station, a radio base station, an access point, a network node, an access node, a wireless node, a radio transceiver, a NodeB, an eNodeB (eNB), a next-generation NodeB or giga-NodeB (either of which may be referred to as a gNB), a Home NodeB, a Home eNodeB, or other suitable terminology. The wireless communications system 100 may include base stations 105 of different types (such as macro or small cell base stations, donor network devices including a central unit (CU) connected to the core network 130, relay network devices including mobile-termination (MT) functionality and distributed unit (DU) functionality).

The UE 115 may include or may be referred to as a mobile device, a wireless device, a remote device, a handheld device, or a subscriber device, or some other suitable terminology in which the "device" may also be referred to as a unit, a station, a terminal, or a client, among other examples. The UE 115 may also include or may be referred to as a personal electronic device such as a cellular phone, a personal digital assistant (PDA), a tablet computer, a laptop computer, or a personal computer. In some examples, the UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as other UEs 115 that may sometimes act as relays as well as base stations 105 and network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with the UE 115 using carrier aggregation or multi-carrier operation. The UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the base stations 105, the UEs 115, or both) may have hardware configurations that support communications over a particular carrier bandwidth or may be configurable to support communications over one of a set of carrier bandwidths. In some examples, the wireless communications system 100 may include the base stations 105, the UEs 115, or both that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, in which the symbol period and subcarrier spacing are inversely related. The quantity of bits carried by each resource element may depend on the modulation scheme (such as the order of the modulation scheme, the coding rate of the modulation scheme, or both). Thus, the more resource elements that the UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into BWPs having the same or different numerologies. In some examples, a UE 115 may be configured with multiple BWPs. In some examples, a single BWP for a carrier is active at a given time, and communications for the UE 115 may be restricted to active BWPs.

Time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example, a macro cell, a small cell, a hot spot, or other types of cells, or various combinations thereof. The term "cell" may refer to a logical communication entity used for communication with a base station 105 (such as over a carrier) and may be associated with an identifier for distinguishing neighboring cells (such as a physical cell identifier (PCID), a virtual cell identifier (VCID), or others). In some examples, a cell may also refer to a geographic coverage area 110 or a portion of a geographic coverage area 110 (such as a sector) over which the logical communication entity operates. Such cells may range from smaller areas (such as a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (such as several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (such as licensed, unlicensed) frequency bands as macro cells. Small cells may provide unrestricted access to UEs 115 with service subscriptions with the network provider or may provide restricted access to UEs 115 having an association with the small cell (such as UEs 115 in a closed subscriber group (CSG), or UEs 115 associated with users in a home or office, among other examples). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable, low-latency or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some base stations 105 may include subcomponents such as an access network entity 140, which may be an example of an access node controller (ANC). Each access network entity 140 may communicate with the UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as radio heads and ANCs) or consolidated into a single base station 105.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (such as a base station 105 or a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (such as antenna panels) to conduct beamforming operations for directional communications with a UE 115. Some signals (such as synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as by a transmitting device, such as a base station 105, or a receiving device, such as a UE 115) a beam direction for subsequent transmission or reception by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received successfully over a communication link 125. A HARQ operation may include a combination of error detection (such as using a cyclic redundancy check (CRC)), forward error correction (FEC), and retransmission (such as an automatic repeat request (ARQ)). HARQ operations may improve throughput at the MAC layer in poor radio conditions (such as low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to another time interval. HARQ feedback may include an acknowledgement (ACK) indicating that a transmission from the base station was successfully received, or a non-acknowledgement (NACK) indicating that the transmission was not successfully received.

In some examples, a UE 115 may be configured to transmit uplink control information, such as CSI and HARQ ACK/NACK feedback, using resources associated with a physical uplink control channel (PUCCH). The UE 115 may be configured to transmit data using resources associated with a physical uplink shared channel (PUSCH).

In some examples, a UE 115 may be configured to multiplex HARQ feedback, such as an ACK, with the CSI such that the ACK and the CSI may be transmitted using the same resources in the same slot. In some examples, a UE 115 may be configured to drop a configured CSI transmission (that is, to refrain from transmitting the CSI) in a slot if the slot is within an inactive DRX duration (for example, at least a portion of the slot is within an inactive DRX duration of the UE 115). In some examples, the UE 115 may be configured to transmit an ACK (if present) in the slot whether or not the CSI is dropped. In some examples, a UE 115 may determine whether the PUCCH resources allocated for transmission of the CSI and the HARQ feedback overlap with the PUSCH resources allocated for the transmission of data. If the resources overlap, the UE 115 may multiplex the CSI and the HARQ feedback over the PUSCH resources, and transmit the multiplexed CSI and HARQ feedback using the PUSCH resources rather than using the PUCCH resources. As discussed in more detail below, a UE 115 may implement one or more techniques for determining whether to transmit or drop the transmission of the CSI based on the DRX operation, and for determining resources on which to transmit the CSI (if the CSI is not dropped) and the ACK.

Figure 2:
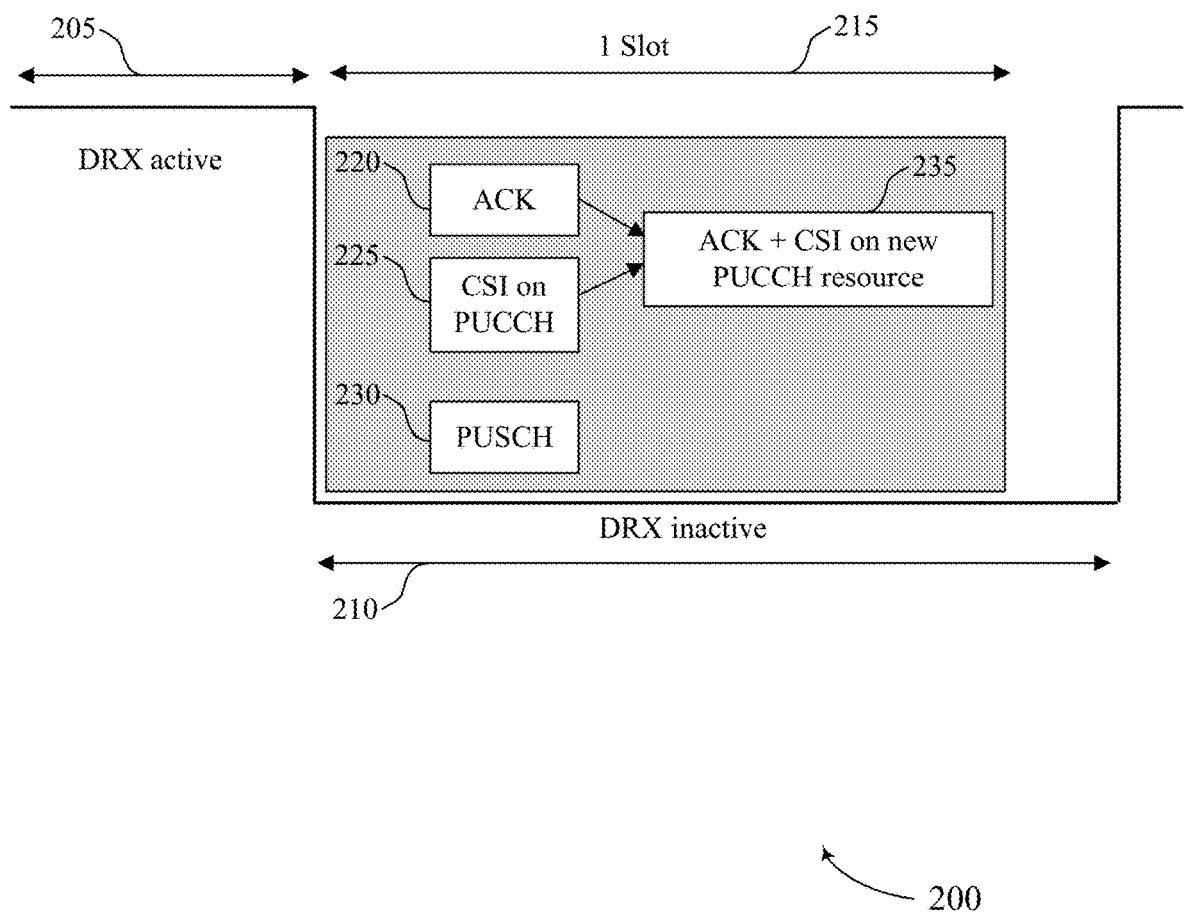
FIG. 2 illustrates an example of a DRX timing that supports dropping channel state information during discontinuous reception in accordance with aspects of the present disclosure.

FIG. 2 illustrates an example of a DRX timing 200 that supports dropping channel state information during discontinuous reception in accordance with one or more aspects of the present disclosure. In some examples, the DRX timing 200 may be implemented by aspects of the wireless communications system 100.

In some examples, a UE (such as UE 115) may receive, from a base station (such as base station 105) an indication of first PUCCH resources 220 for transmitting an ACK to the base station during a slot 215 and second PUCCH resources 225 for transmitting CSI to the base station during the slot 215. In some examples, the indication of the first PUCCH resources 220 may be provided to the UE via downlink control information (DCI) and an indication of the second PUCCH resources 225 may be provided to the UE via RRC signaling. In some examples, the first PUCCH resources 220 may overlap with the second PUCCH resources 225 in time, in frequency, or both.

In some examples, the UE may determine whether the first PUCCH resources 220 or the second PUCCH resources 225 overlap with PUSCH resources 230. The PUSCH resources 230 may have been allocated to the UE for transmission of data to the base station during the slot 215, for example.

In some examples, if the first PUCCH resources 220 or the second PUCCH resources 225 (or both) overlap with the PUSCH resources 230, the UE may select the new PUCCH resources 235 in the slot 215 for transmitting the CSI and the ACK. The UE may then multiplex the CSI and the ACK over the new PUCCH resources 235 for transmission (for example, to the base station).

As described herein, a UE (such as UE 115) may operate in a DRX mode that includes an active DRX duration 205 and an inactive DRX duration 210. In DRX timing 200, the slot 215 that includes a configured transmission of the CSI and the ACK is entirely within the inactive DRX duration 210. As described in more detail with reference to FIGS. 3A and 3B, in some examples, a UE may drop a configured transmission of CSI in the slot 215 based on determining that the slot 215 is within an inactive DRX duration 210.

In some other examples, if the slot 215 was within an active DRX duration 205, the UE may determine not to drop the transmission of the CSI, and may transmit the multiplexed CSI and ACK during the slot 215.

Figure 3A:
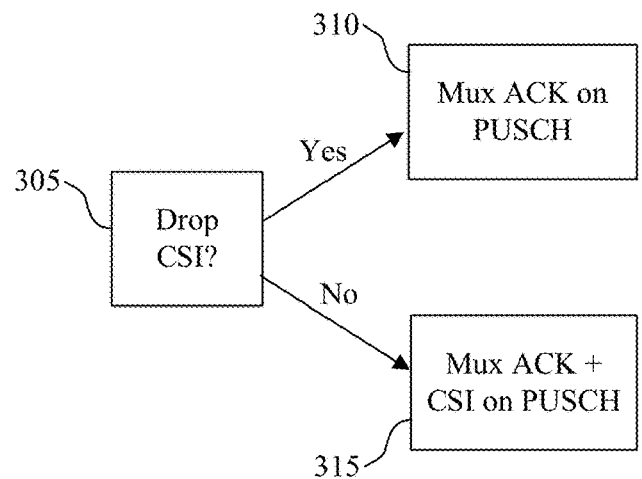
FIGS. 3A and 3B illustrate examples of process flows that support dropping channel state information during discontinuous reception in accordance with aspects of the present disclosure.
Figure 3B:
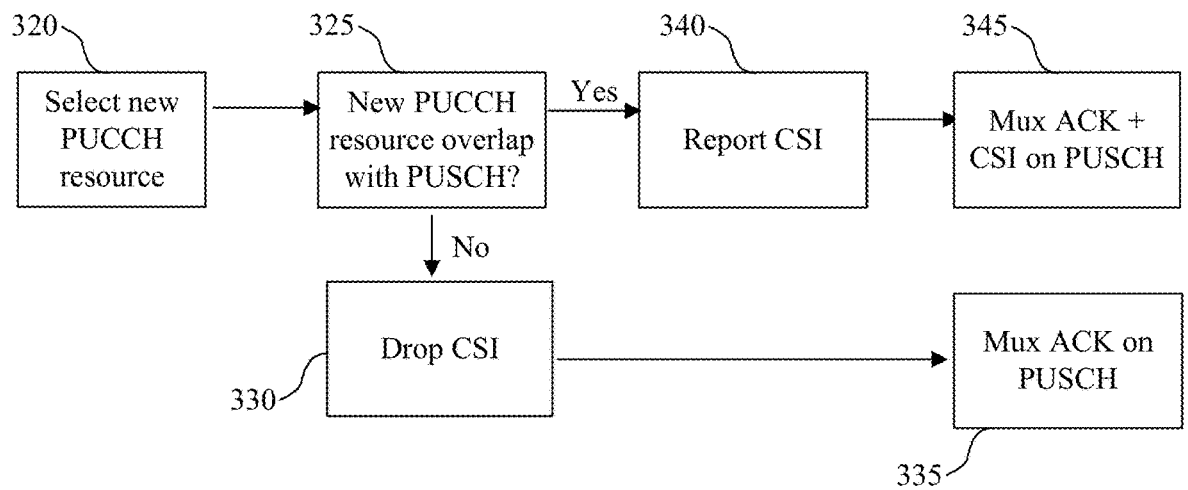

FIGS. 3A and 3B depict process flows that may be performed by a UE, such as UE 115, based on DRX timing 200. As depicted in DRX timing 200, the PUCCH resources 220 and 225 allocated for transmission of the CSI and the ACK in the slot 215 overlap with the PUSCH resources 230 allocated for transmission of data in the slot 215. In this case, the UE may multiplex the CSI and the ACK over the PUSCH resources 230 and transmit the multiplexed CSI and ACK in the slot using the PUSCH resources 230 (rather than using the PUCCH resources). In some examples, this process may be referred to as "piggybacking" the CSI and the ACK on the PUSCH resources.

Alternatively, the UE may select new PUCCH resources 235 and multiplex the CSI and the ACK over the new PUCCH resources 235 and transmit the multiplexed CSI and ACK in the slot using the new PUCCH resources 235.

As previously discussed, however, if the UE is operating in a DRX mode, the UE may determine whether to drop transmission of the CSI based on whether the CSI is configured to be transmitted in resources in a slot that is within an inactive DRX duration. The UE may make this determination based on whether the original RRC-configured PUCCH resources 225 are configured to be transmitted during an inactive DRX duration, as described with reference to FIG. 3A, or based on whether new resources selected by the UE, such as new PUCCH resources 235 or PUSCH resources 230, are configured to be transmitted during the inactive DRX duration as described with reference to FIG. 3B.

FIG. 3A depicts an example of UE process flow if operating in a DRX mode, in which the UE determines whether to drop CSI based on the original RRC-configured PUCCH resources 225 based on DRX timing 200.

At block 305, the UE may determine whether to drop the configured transmission of the CSI in the slot. The UE may determine whether to drop the configured transmission of CSI in the slot based on whether at least a portion of the slot that includes the RRC-configured PUCCH resources 225 is within an inactive DRX duration, such that, for example, some or all of the symbols of the RRC-configured PUCCH resources 225 are configured to be transmitted during the inactive DRX duration. For example, a UE may drop a configured CSI transmission if the UE determines that a starting symbol (such as a starting OFDM symbol) of the RRC-configured PUCCH resources 220 allocated for the CSI is within the inactive DRX duration (for example, scheduled to be transmitted during the inactive DRX duration), or if the ending symbol of the PUCCH resources 220 allocated for the CSI is within the inactive DRX duration, or if any symbol of PUCCH resources 220 is within the inactive DRX duration. In some examples the UE may drop a configured CSI transmission if the UE determines that a quantity of symbols satisfying a threshold (such as majority of symbols) of the PUCCH resources allocated for the CSI are within the inactive DRX duration.

In DRX timing 200, the entire slot 215 is within the inactive DRX duration. Thus, the UE may determine to drop the configured CSI and may, at block 310, multiplex the ACK over the PUSCH resources and transmit the multiplexed ACK to the base station using the PUSCH resources.

Alternatively, if the UE determines that the slot is not within an inactive DRX duration (that is, if the UE determines that some or all of the slot is within an active DRX duration such that some or all of the PUCCH resources for transmitting the CSI are configured to be transmitted during an active DRX duration, a scenario that is not shown in DRX timing 200), the UE may, at block 315, multiplex the CSI and the ACK over the PUSCH resources, and may transmit the multiplexed CSI and ACK to the base station using the PUSCH resources.

FIG. 3B depicts an alternative process flow in which the UE determines whether to drop the transmission of the CSI based on the new PUCCH resources 235 or the PUSCH resources 230 rather than based on the original RRC-configured PUCCH resources 220 and 225 based on DRX timing 200.

At block 320, the UE may select new PUCCH resources for transmitting the CSI and the ACK. In some examples, the UE may select the new PUCCH resources 235 based on determining that one or both of the RRC-configured PUCCH resources 225 or the DCI-signaled PUCCH resources 220 allocated by the base station overlap with the PUSCH resources 230.

At block 325, the UE may determine whether the new PUCCH resources 235 overlap (for example, continue to overlap) with the PUSCH resources 230. If so, then at block 340 the UE may determine to report the CSI (that is, not to drop the transmission of the CSI), and at block 345 the UE may multiplex the ACK and the CSI over the PUSCH resources 230 and transmit (piggyback) the multiplexed ACK and CSI using the PUSCH resources 230.

Alternatively, if the UE determines at block 325 that the new PUCCH resources 235 do not overlap the PUSCH resources 230, the UE may, at block 330, determine to drop the transmission of the CSI, and at block 335 the UE may multiplex the ACK over the PUSCH resources 230 and transmit (piggyback) the multiplexed ACK to the base station using the PUSCH resources 230. The UE may drop the transmission of the CSI by excluding the CSI from being multiplexed over the PUSCH resources 230.

In some examples, a UE may multiplex CSI over the PUSCH resources 230 (such as when the RRC-configured PUCCH resources 225 or new PUCCH resources 235 overlap the PUSCH resources 230). In some examples, the UE may multiplex the CSI over the PUSCH resources 230 with or without additional information (such as an ACK, other UCI information, or data). The UE may then determine whether to potentially drop the configured transmission of CSI in the slot based on whether at least a portion of the slot that includes the PUSCH resources 230 (such as the portion of the slot that includes the PUSCH resources 230 that overlap with the RRC-configured resources 225 or the new PUCCH resources 235 that may be configured for transmission of the CSI) is within an inactive DRX duration.

If the UE determines not to drop the configured transmission of the CSI, the UE may transmit the multiplexed CSI (with the additional information, if present) using the PUSCH resources 230. If the UE determines to potentially drop the configured transmission of the CSI, the UE may determine whether there is additional information multiplexed over the PUSCH resources 230 (for example, whether additional information was multiplexed with or separate from the multiplexed CSI), such as an ACK, addition UCI, or data to be transmitted. If there is additional information multiplexed over the PUSCH resources 230, the UE may transmit the multiplexed CSI and the additional information to the base station using the PUSCH resources 230. That is, the UE may not drop the CSI transmission if there is additional information multiplexed with the CSI, such as to avoid dropping transmission of an ACK. Otherwise, the UE may drop the configured transmission of the CSI.

Figure 4:
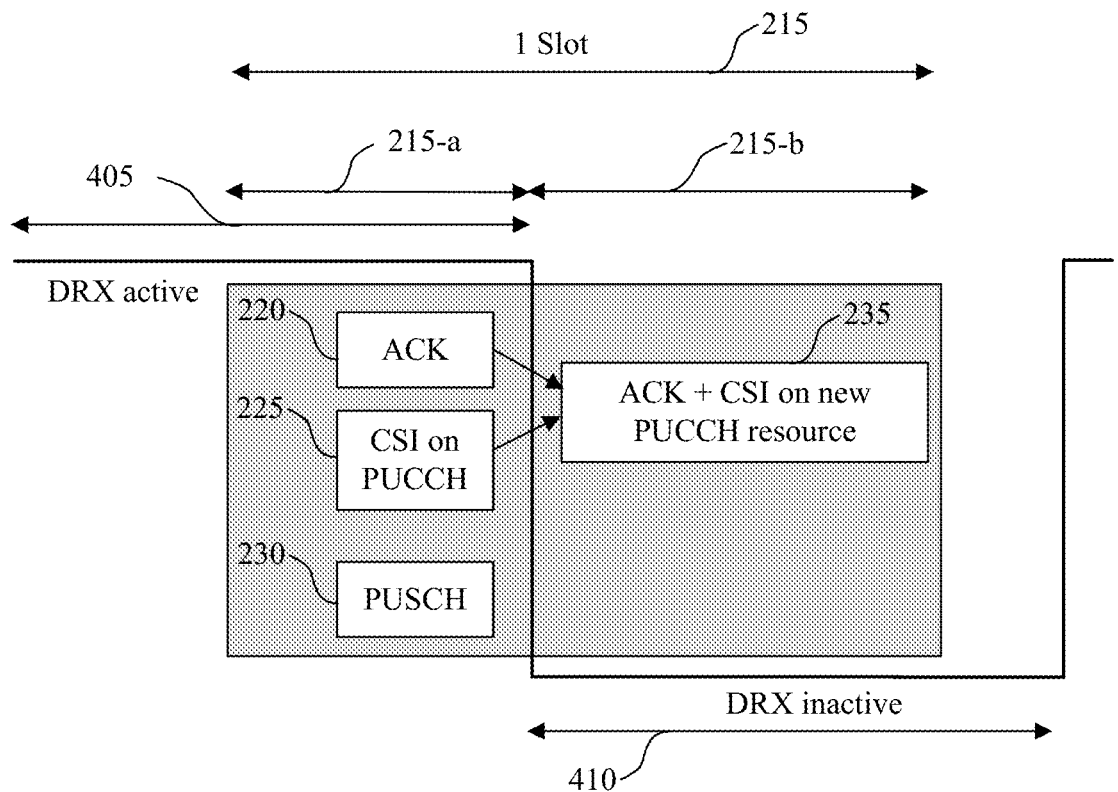
FIG. 4 illustrates an example of a DRX timing that supports dropping channel state information during discontinuous reception in accordance with aspects of the present disclosure.

FIG. 4 illustrates an example of a DRX timing 400 that supports dropping channel state information during discontinuous reception in accordance with one or more aspects of the present disclosure. In some examples, the DRX timing 400 may be implemented by aspects of the wireless communications system 100. The DRX timing 400 may be similar to the DRX timing 200 in some aspects, but in DRX timing 400 a first portion 215-*a* of the slot 215 is within the active DRX duration 405 and a second portion 215-*b* of the slot 215 is within the inactive DRX duration 410. As described in more detail with reference to FIGS. 5A and 5B, in some examples, a UE may drop a configured transmission of the CSI in the slot 215 based on determining that a portion of slot 215 (such as the second portion 215-*b*) that includes the resources for transmitting the CSI (for example, either the original RRC-configured PUCCH resources or new resources) is within an inactive DRX duration 410.

Figure 5A:
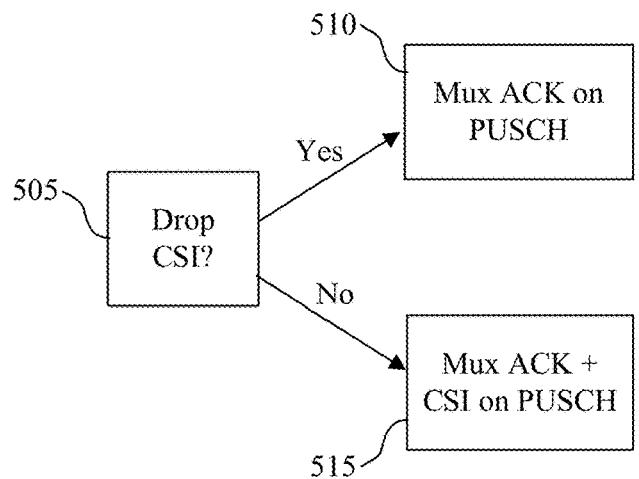
FIGS. 5A and 5B illustrate examples of process flows that support dropping channel state information during discontinuous reception in accordance with aspects of the present disclosure.
Figure 5B:
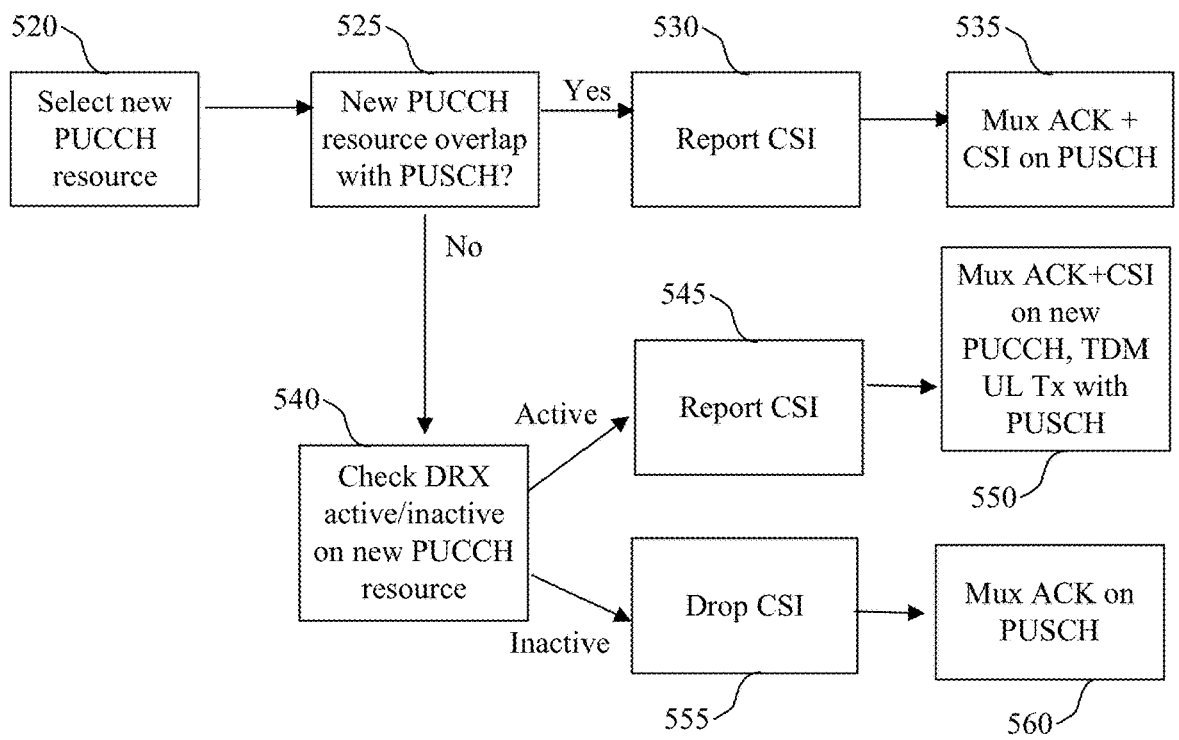

FIGS. 5A and 5B illustrate examples of process flows that support dropping channel state information during discontinuous reception in accordance with one or more aspects of the present disclosure. FIGS. 5A and 5B depict process flows that may be performed by a UE, such as the UE 115, based on the DRX timing 400.

As depicted in the DRX timing 400, the PUCCH resources 220 and 225 allocated for transmission of the CSI and the ACK in the slot 215 overlap with the PUSCH resources 230 allocated for the transmission of data in the slot 215. In this case, the UE may multiplex the CSI and the ACK over the PUSCH resources 230 and transmit the multiplexed CSI and ACK in the slot using the PUSCH resources 230 (rather than using the PUCCH resources). Alternatively, the UE may select new PUCCH resources 235 and multiplex the CSI and the ACK over the new PUCCH resources 235 and transmit the multiplexed CSI and ACK in the slot using the new PUCCH resources 235.

As previously discussed, however, if the UE is operating in a DRX mode, the UE may determine whether to drop transmission of the CSI based on whether the CSI is configured to be transmitted using resources that are in a slot that is within an inactive DRX duration. The UE may make this determination based on whether the original RRC-configured PUCCH resources 225 are configured to be transmitted during an inactive DRX duration, as described with reference to FIG. 5A, or based on whether new resources selected by the UE, such as new PUCCH resources 235, are configured to be transmitted during an inactive DRX duration as described with reference to FIG. 5B.

FIG. 5A depicts an example of a UE process flow if operating in a DRX mode under the scenario of DRX timing 400, in which the UE determines whether to drop the transmission of the CSI based on the original RRC-configured PUCCH resources 225. The process flow of FIG. 5A may be similar to the process flow of FIG. 3A, although the outcome may be different than in FIG. 3A because a first portion 215-*a* of the slot 215 is within an active DRX duration 405 and a second portion 215-*b* of the slot 215 is within an inactive DRX duration 410.

At block 505, the UE may determine whether to drop the configured transmission of the CSI in the slot. The UE may determine whether to drop the configured transmission of CSI in the slot based on whether at least a portion of the slot that includes the RRC-configured PUCCH resources 225 is within the inactive DRX duration 410. In this example, a second portion 215-*b* of the slot 215 is within the inactive DRX duration, so the UE may determine to drop the transmission of the CSI. As described with reference to FIG. 3A, the UE may drop a configured CSI transmission if the UE determines that a starting symbol (such as a starting OFDM symbol) of the RRC-configured PUCCH resources 225 allocated for the CSI is within the inactive DRX duration 410, or if the ending symbol of the PUCCH resources 225 allocated for the CSI is within the inactive DRX duration 410, or if any symbol of the PUCCH resources 225 is within the inactive DRX duration. In some examples the UE may drop a configured CSI transmission if the UE determines that a quantity of symbols satisfying a threshold (such as a majority of symbols) of the PUCCH resources 225 allocated for the CSI are within the inactive DRX duration 410. For example, the UE may determine a first quantity of symbols of the PUCCH resources 225 that are within the active DRX duration 405 and a second quantity of symbols of the PUCCH resources 225 that are within the inactive DRX duration 410. The UE may determine to report (for example, transmit) the CSI if the first quantity of symbols is larger than the second quantity of symbols, or may determine to drop the transmission of the CSI if the second quantity of symbols is larger than the first quantity of symbols.

If the UE determines to drop the configured CSI the UE may, at block 510, multiplex the ACK over the PUSCH resources and transmit the multiplexed ACK to the base station using the PUSCH resources. Alternatively, if the UE determines not to drop the configured CSI the UE may, at block 515, multiplex the CSI and the ACK over the PUSCH resources, and may transmit the multiplexed CSI and ACK to the base station using the PUSCH resources.

FIG. 5B depicts an alternative example of a UE process flow if operating in a DRX mode under the scenario of DRX timing 400, in which the UE determines whether to drop CSI based on the new PUCCH resources 235 rather than based on the original RRC-configured PUCCH resources 225.

At block 520, the UE may select new PUCCH resources 235 for transmitting the CSI and the ACK. In some examples, the UE may select the new PUCCH resources 235 based on determining that the RRC-configured PUCCH resources 225 allocated by the base station overlap with the PUSCH resources 230.

At block 525, the UE may determine whether the new PUCCH resources 235 overlap (for example, continue to overlap) with the PUSCH resources 230. If so, then at block 530 the UE may determine to report the CSI (that is, not to drop the transmission of the CSI), and at block 535 the UE may multiplex the ACK and the CSI over the PUSCH resources 230 and transmit the multiplexed ACK and CSI using the PUSCH resources 230.

Alternatively, if the UE determines at block 525 that the new PUCCH resources 235 do not overlap with the PUSCH resources 230, the UE may, at block 540, determine whether some or all of the new PUCCH resources 235 are in a portion of a slot 215 that is within the inactive DRX duration 410. For example, the UE may determine whether the starting symbol, the ending symbol, or another symbol of the new PUCCH resources 235 are in a portion of a slot 215 that is within the inactive DRX duration 410, or whether a quantity of symbols satisfying a threshold (such as a majority of symbols) of the new PUCCH resources 235 are within the inactive DRX duration 410.

The UE may determine, for example, whether to drop the transmission of the CSI based on whether some or all of the new PUCCH resources 235 are in a portion of a slot 215 that is within the inactive DRX duration 410, or conversely, based on whether some or all of the new PUCCH resources 235 are in a portion of a slot that is within an active DRX duration.

If the UE determines at block 540 that some or all of the new PUCCH resources 235 (for example, if a first symbol, a last symbol, another symbol, or all of the symbols) are in a portion of a slot 215 that is within the active DRX duration 405 the UE may, at block 545, determine to report the CSI, and may, at block 550, multiplex the ACK and the CSI on the new PUCCH resources 235. In some examples, the UE may transmit the multiplexed ACK and CSI using the new PUCCH resources. In some examples, the UE may transmit the multiplexed ACK and CSI using the new PUCCH resources by time-division-multiplexing the uplink transmission of the multiplexed ACK and CSI on the new PUCCH resources with a PUSCH transmission.

If the UE determines at 540 that some or all of the new PUCCH resources 235 are in a portion of a slot 215 that is within the inactive DRX duration 410 (for example, based on the same symbols evaluated at block 540, such as the first symbol, the last symbol, another symbol, or all of the symbols), the UE may, at 555, determine to drop the transmission of the CSI, and may, at 560, multiplex the ACK over the PUSCH resources 230. In some examples, the UE may transmit the multiplexed ACK using the PUSCH resources.

Figure 6:
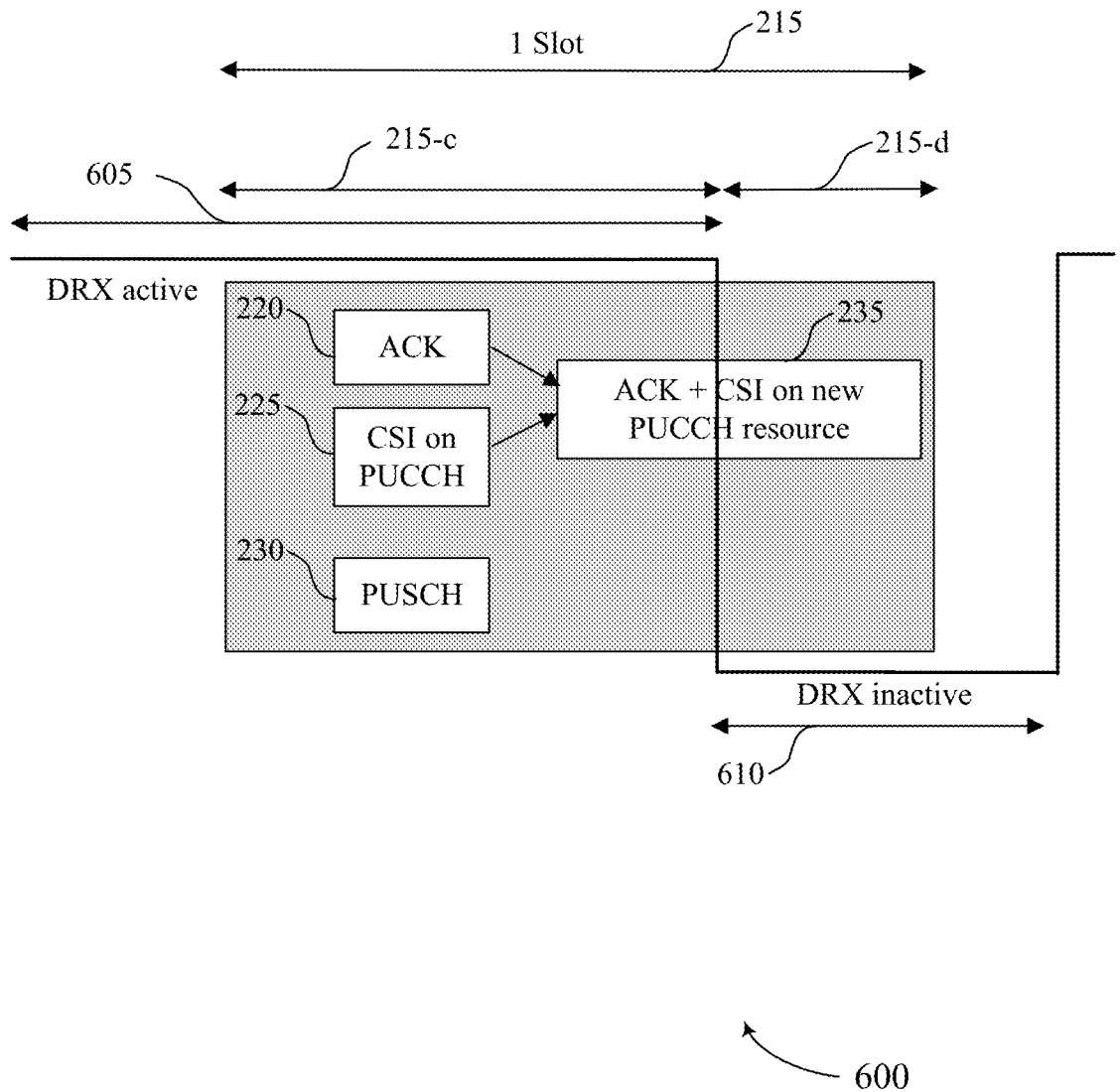
FIG. 6 illustrates an example of a DRX timing that supports dropping channel state information during discontinuous reception in accordance with aspects of the present disclosure.

FIG. 6 illustrates an example of a DRX timing 600 that supports dropping channel state information during discontinuous reception in accordance with one or more aspects of the present disclosure. In some examples, the DRX timing 600 may be implemented by aspects of the wireless communications system 100. DRX timing 600 may be similar to the DRX timings 200 and 400, but in this example, a first portion 215-c of slot 215 is within the active DRX duration 605 and a second portion 215-d of slot 215 is within the inactive DRX duration 610. In this example, the UE transitions from the active DRX duration 605 to the inactive DRX duration 610 in the middle of a configured CSI transmission on the new PUCCH resources 235. As described in more detail with reference to FIGS. 7A and 7B, in some examples, a UE may drop the configured transmission of CSI in the slot 215 based on determining that a portion of slot 215 (such as the second portion 215-d) that includes some or all of the new PUCCH resources for transmitting the CSI is within an inactive DRX duration 610.

Figure 7A:
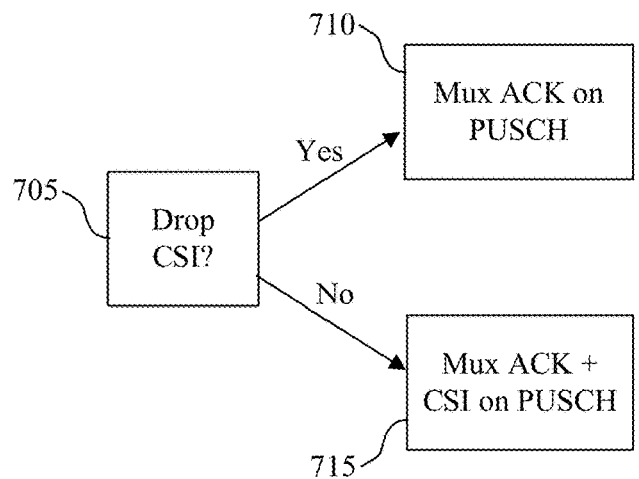
FIGS. 7A and 7B illustrate examples of process flows that support dropping channel state information during discontinuous reception in accordance with aspects of the present disclosure.
Figure 7B:
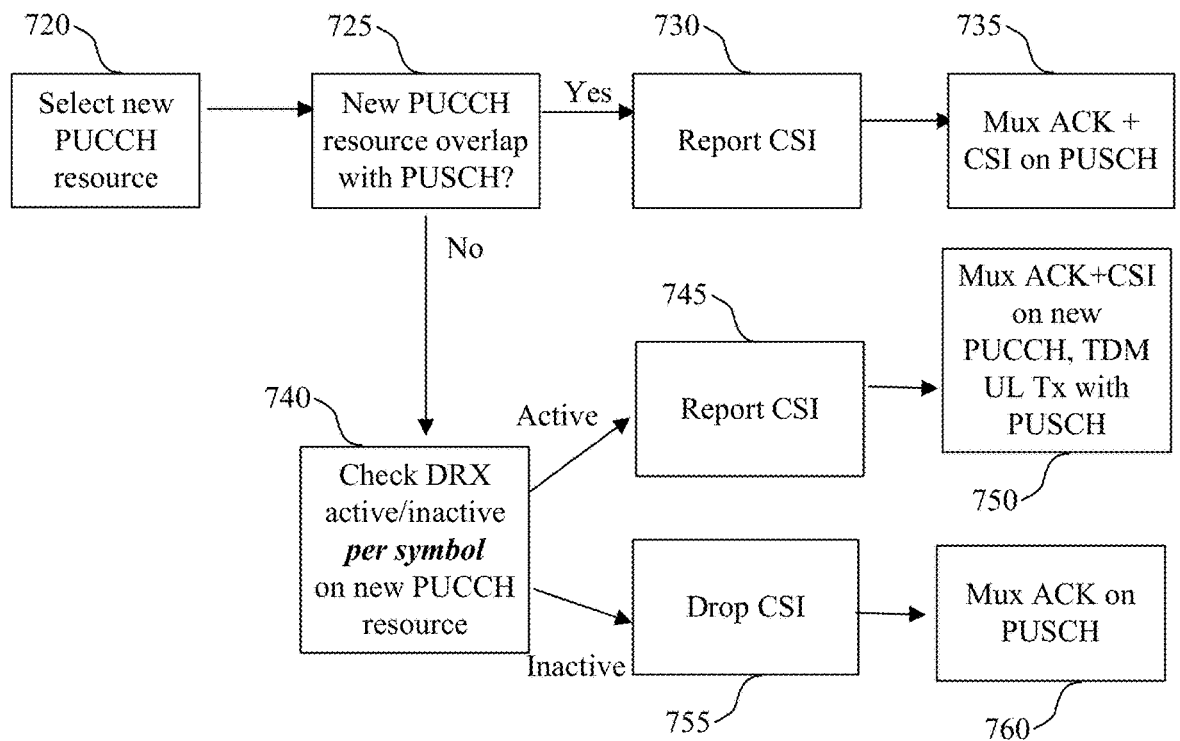

FIGS. 7A and 7B illustrate examples of process flows that support dropping channel state information during discontinuous reception in accordance with one or more aspects of the present disclosure. FIGS. 7A and 7B depict process flows that may be performed by a UE, such as UE 115, under the scenario of the DRX timing 600.

FIG. 7A depicts a process flow that similar to the process flow depicted in FIG. 5A. In the process flow covered by FIG. 7A, the UE may determine, at block 705, whether to drop the configured transmission of the CSI in the slot based on the RRC-configured PUCCH resources, and depending on the outcome of block 705, the UE may either drop the transmission of the CSI and multiplex the ACK over the PUSCH resources at block 710 or report the CSI and multiplex the ACK and CSI over the PUSCH resources at block 715.

FIG. 7B depicts an alternative example of a UE's process if operating in a DRX mode, in which the UE determines whether to drop CSI based on the new PUCCH resources 235 rather than based on the original RRC-configured PUCCH resources 225. FIG. 7B depicts a process flow that is similar to the process flow depicted in FIG. 5B, with a difference occurring at block 740. At block 740, the UE may determine whether some or all of the new PUCCH resources 235 are in a portion of a slot 215 that is within the inactive DRX duration 610 by determining whether each symbol of the new PUCCH resources 235 is in a portion of a slot 215 that is within the inactive DRX duration 610. In some examples, if any symbol of the new PUCCH resources 235 is in a portion of a slot 215 that is within the inactive DRX duration 610, the UE may determine to drop the transmission of the CSI report at block 755 and may multiplex the ACK over the PUSCH resources at block 760. The UE may then transmit the multiplexed ACK to the base station using the PUSCH resources.

Conversely, in some examples, if the UE determines that none of the symbols of the new PUCCH resources 235 are in a portion of a slot 215 that is within the inactive DRX duration 610, the UE may determine to report the CSI at block 745, and may proceed to multiplex the ACK and the CSI on the new PUCCH resources 235 and transmit the multiplexed ACK and CSI to the base station using the new PUCCH resources 235. In some examples, the UE may transmit the multiplexed ACK and CSI to the base station using the new PUCCH resources 235 by time-division-multiplexing the transmission of the ACK and CSI on the new PUCCH resources 235 with an uplink transmission on the PUSCH resources.

Figure 8:
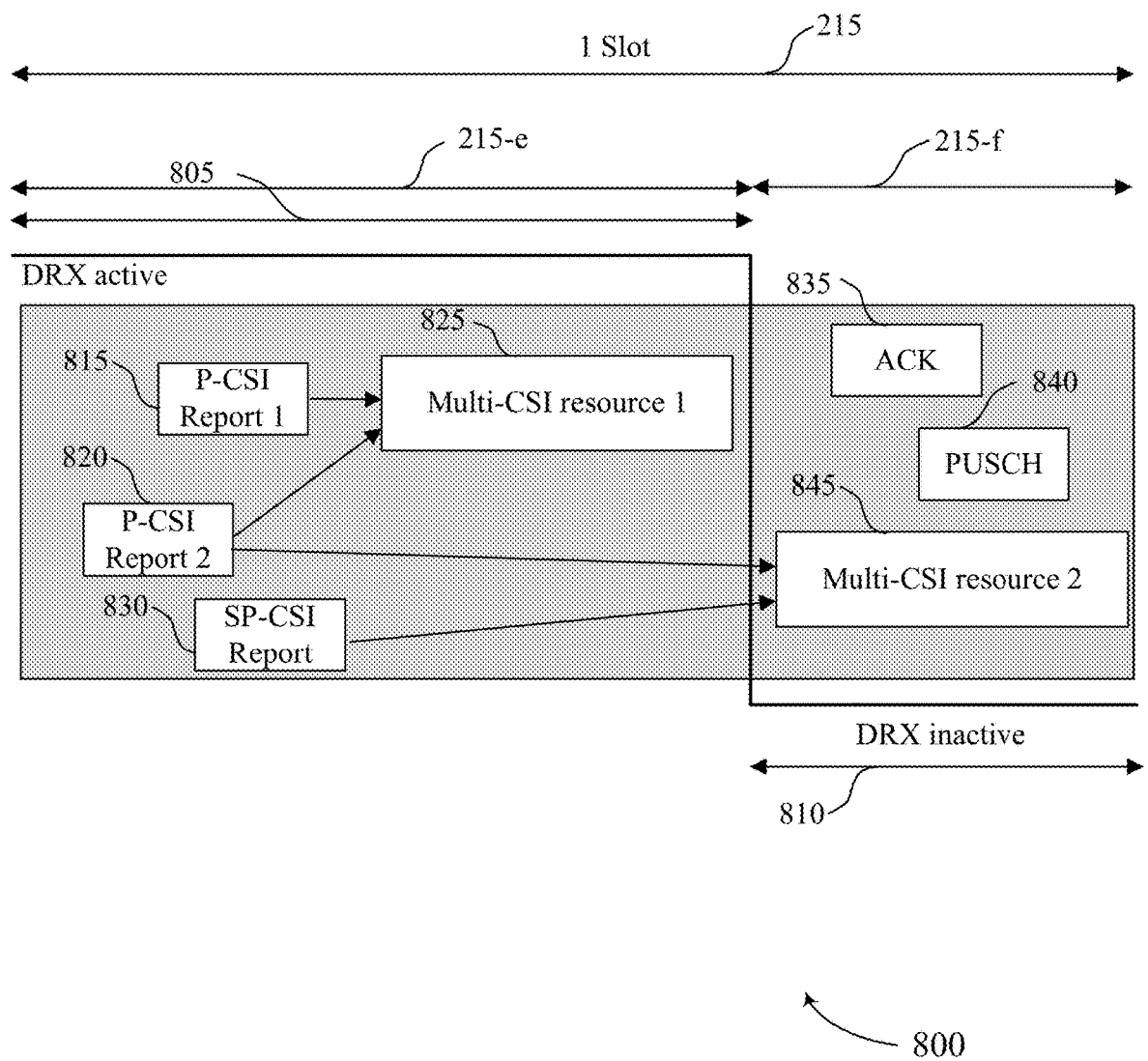
FIG. 8 illustrates an example of a DRX timing that supports dropping channel state information during discontinuous reception in accordance with aspects of the present disclosure.

FIG. 8 illustrates an example of a DRX timing 800 that supports dropping channel state information during discontinuous reception in accordance with one or more aspects of the present disclosure. In some examples, the DRX timing 800 may be implemented by aspects of the wireless communications system 100. The DRX timing 800 may be an example of a DRX timing if one or more multi-CSI PUCCH resources are configured.

For example, a UE may be configured with first PUCCH resources 815 for transmitting a first periodic CSI (P-CSI) report, second PUCCH resources 820 for transmitting a second P-CSI report, third PUCCH resources 830 for transmitting a semi-persistent CSI (SP-CSI) report, fourth PUCCH resources 835 for transmitting an ACK, and PUSCH resources 840 for transmitting data. The UE may also be configured with first multi-CSI PUCCH resources 825 and second multi-CSI PUCCH resources 845. In some examples, the multi-CSI PUCCH resources 825 and 845 may be used for transmitting multiple CSI reports.

In some examples, if any of the PUCCH resources 815, 820, or 830 for transmitting a periodic CSI report or semi-persistent CSI report overlap with each other, the UE may multiplex multiple CSI reports over one of the two multi-CSI PUCCH resources 825 or 845, and may transmit the multiplexed CSI reports using the multi-CSI PUCCH resources 825 or 845. In some examples, selection of the multi-CSI PUCCH resources 825 and 845 for transmission of multiple CSI reports may be based on the total payload size of the multiplexed CSI reports, among other factors. Therefore, the activation of a semi-persistent CSI report may change the selection of the multi-CSI PUCCH resources 825 and 845. In DRX timing 800, one of the multi-CSI PUCCH resources 825 is in a portion of a slot 215 that is within an active DRX duration 805 and the other multi-CSI PUCCH resources 845 is in a portion of a slot 215 that is within an inactive DRX duration 810. In some examples, the UE behavior process may depend on if and how the UE determines whether the CSI is in a portion of a slot 215 that is within an inactive DRX duration 810, such as whether the UE makes this determination before or after multiplexing multiple CSI reports over a multi-CSI PUCCH resources 825 or 845, as described with reference to FIGS. 9A and 9B.

Figure 9A:
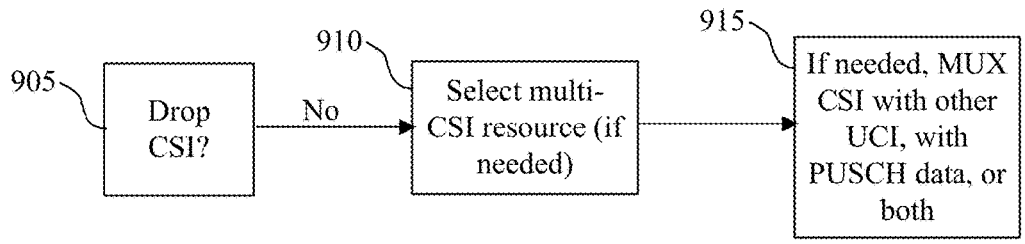
FIGS. 9A and 9B illustrate examples of process flows that support dropping channel state information during discontinuous reception in accordance with aspects of the present disclosure.
Figure 9B:
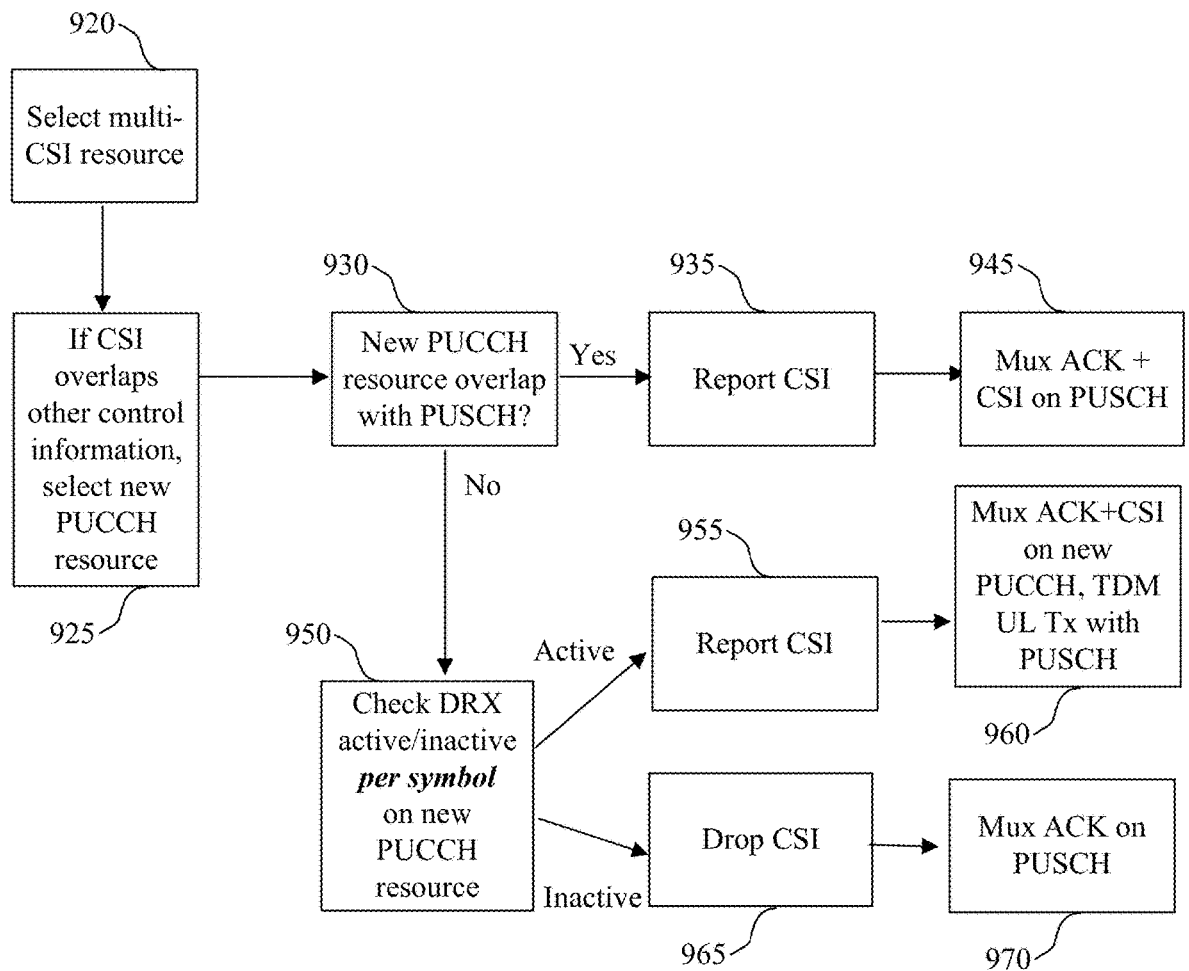

FIGS. 9A and 9B illustrate examples of process flows that support dropping channel state information during discontinuous reception in accordance with one or more aspects of the present disclosure. FIGS. 9A and 9B depict process flows that may be performed by a UE, such as UE 115, under the scenario of the DRX timing 800.

FIG. 9A depicts a process flow in which the UE may determine, at block 905, whether to drop a configured transmission of the CSI in the slot based on the RRC-configured PUCCH resources, such as first PUCCH resources 815, second PUCCH resources 820, or third PUCCH resources 830. That is, the UE may determine whether to drop each CSI (such as each periodic CSI and each semi-persistent CSI) based on the corresponding RRC-configured PUCCH resources for the CSI. If the UE determines not to drop one or more of the CSIs, the UE may, at block 910, select one or more new multi-CSI PUCCH resources 825 and 845 for transmitting multiple CSI reports. At block 915, the UE may multiplex the CSI with other uplink control information (such as an ACK), with PUSCH data, or with both. In some examples, the UE may transmit the multiplexed CSI and (if needed) the ACK and PUSCH data using the new multi-CSI PUCCH resources 825 and 845. In some examples, the UE may transmit the multiplexed CSI and (if needed) the ACK and PUSCH data using PUSCH resources.

FIG. 9B depicts an alternative process flow in which the UE determines whether to drop each CSI based on the new multi-CSI PUCCH resources 825 and 845 rather than based on the original RRC-configured PUCCH resources 815, 820, and 830. That is, the UE may determine whether to drop each CSI after selecting a multi-CSI PUCCH resource for transmitting the CSI.

At block 920, a UE may select new multi-CSI PUCCH resources 825 or 845 for transmitting multiple CSIs. At block 925, the UE may determine that one or more of the CSIs overlaps with other control information, and may select new PUCCH resources based on the determination. In some examples, the new PUCCH resources may be the same as the multi-CSI PUCCH resources. In some examples, the new PUCCH resources may be different than the multi-CSI PUCCH resources.

At block 930, the UE may determine whether the new PUCCH resources overlap with PUSCH resources 840.

The UE may then proceed to perform the additional procedures shown at blocks 935, 945, 950, 955, 960, 965, and 970 similar to the corresponding blocks 730, 735, 740, 745, 750, 755, and 760 as described with reference to FIG. 7B.

Figure 10:
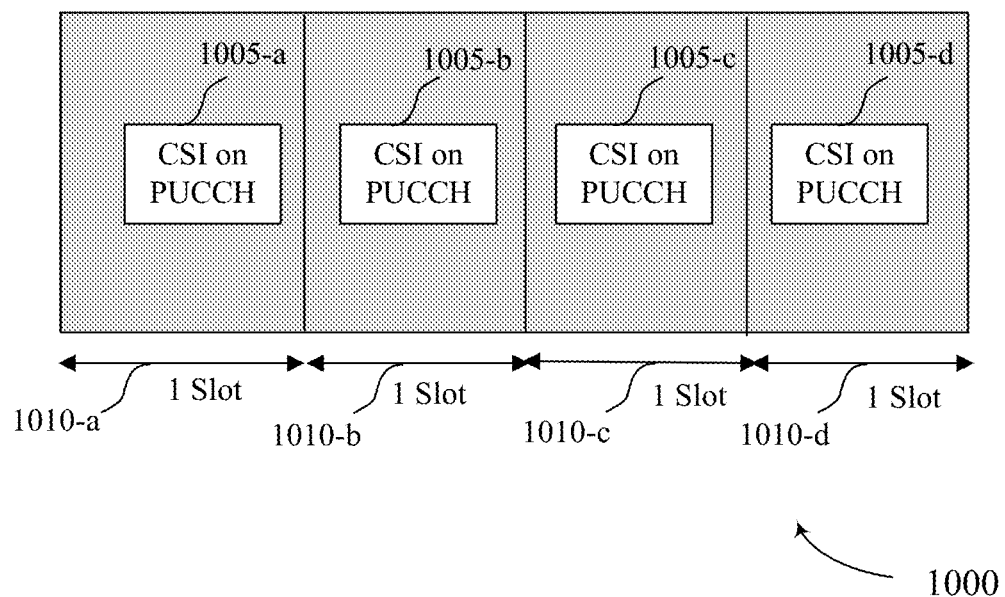
FIG. 10 illustrates an example of a resource allocation that supports dropping channel state information during discontinuous reception in accordance with aspects of the present disclosure.

FIG. 10 illustrates an example of a resource allocation 1000 that supports dropping channel state information during discontinuous reception in accordance with one or more aspects of the present disclosure.

In some examples, a UE may be configured to transmit multiple repetitions of the same CSI using PUCCH resources 1005-a, 1005-b, 1005-c, and 1005-d in multiple slots 1010-a, 1010-b, 1010-c, and 1010-d, respectively. In this example, the UE may determine whether to drop each CSI repetition (for example, individually) based on the RRC-configured PUCCH resources 1005-a, 1005-b, 1005-c, and 1005-c for each CSI repetition. For example, the UE may perform operations as described with reference to the process flows related to FIGS. 2-9 on each CSI repetition to determine whether to drop each CSI repetition. In this case, the UE may determine to drop all the CSI repetitions, to transmit all the CSI repetitions, or to drop some of the CSI repetitions and to transmit other CSI repetitions.

In some examples, the UE may determine whether to drop all the CSI repetitions based on the RRC-configured PUCCH resources 1005-a of the first CSI repetition. For example, the UE may perform process flows such as those described with reference to FIGS. 2-9 on the first CSI repetition. In this example, the UE may determine to drop all of the CSI repetitions or to transmit all of the CSI repetitions, but may not determine to drop some of the CSI repetitions and to transmit other CSI repetitions.

Figure 11:
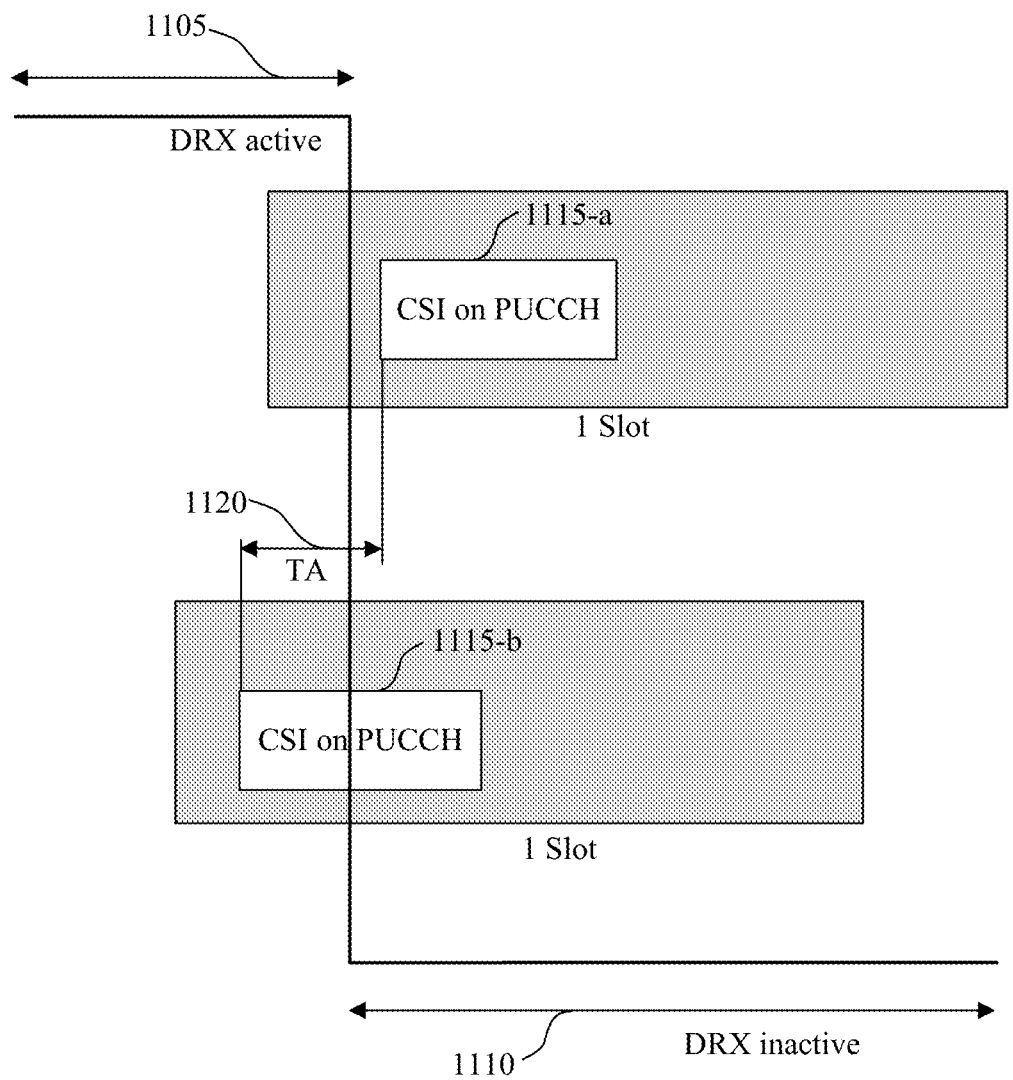
FIG. 11 illustrates an example of a DRX timing that supports dropping channel state information during discontinuous reception in accordance with aspects of the present disclosure.

FIG. 11 illustrates an example of a DRX timing 1100 that supports dropping channel state information during discontinuous reception in accordance with one or more aspects of the present disclosure.

In some examples, a UE may use a timing advance 1120 if scheduling slots for communication, such as shown in DRX timing 1100. A timing advance may be a duration for which a slot is advanced in time from a first time (for example, an initial time) to a second time (for example, a shifted time). That is, a slot may be configured to begin during an earlier time based on a timing advance 1120.

In some examples, a MAC layer may consider the transmission time of CSI within a slot without the timing advance, such as the transmission time associated with the CSI on PUCCH 1115-*a*. This time may be referred to as a logical transmission time. In some examples, a PHY layer may consider the transmission time of the CSI within a slot including the timing advance, such as the transmission time associated with the CSI on PUCCH 1115-*b*. This time may be referred to as a physical transmission time.

In some examples, a UE may determine whether to drop CSI based on the logical transmission time (that is, excluding the timing advance 1120) or based on the physical transmission time (that is, including the timing advance 1120).

In the DRX timing 1100, the CSI on the PUCCH 1115-*a* occurs in an inactive DRX duration 1110 (based on the logical transmission time). In contrast, a portion of the CSI on the PUCCH 1115-*b* occurs in an active DRX duration 1105 and a portion of the CSI on the PUCCH 1115-*b* occurs in an inactive DRX duration 1110 (based on the physical transmission time). Thus, if the UE determines whether to drop the transmission of the CSI as described with reference to FIGS. 2-10 based on the logical transmission time, the UE may determine to drop the transmission of the CSI because the CSI on the PUCCH 1115-*a* may occur entirely in the inactive DRX duration. Alternatively, if the UE determines whether to drop the transmission of the CSI as described with reference to FIGS. 2-10 based on the physical transmission time, the UE may determine to drop the transmission of the CSI or transmit the CSI, depending on whether the UE makes the determination based on the starting symbol of the CSI, the ending symbol of the CSI, or based on one or more other symbols of the CSI.

Figure 12:
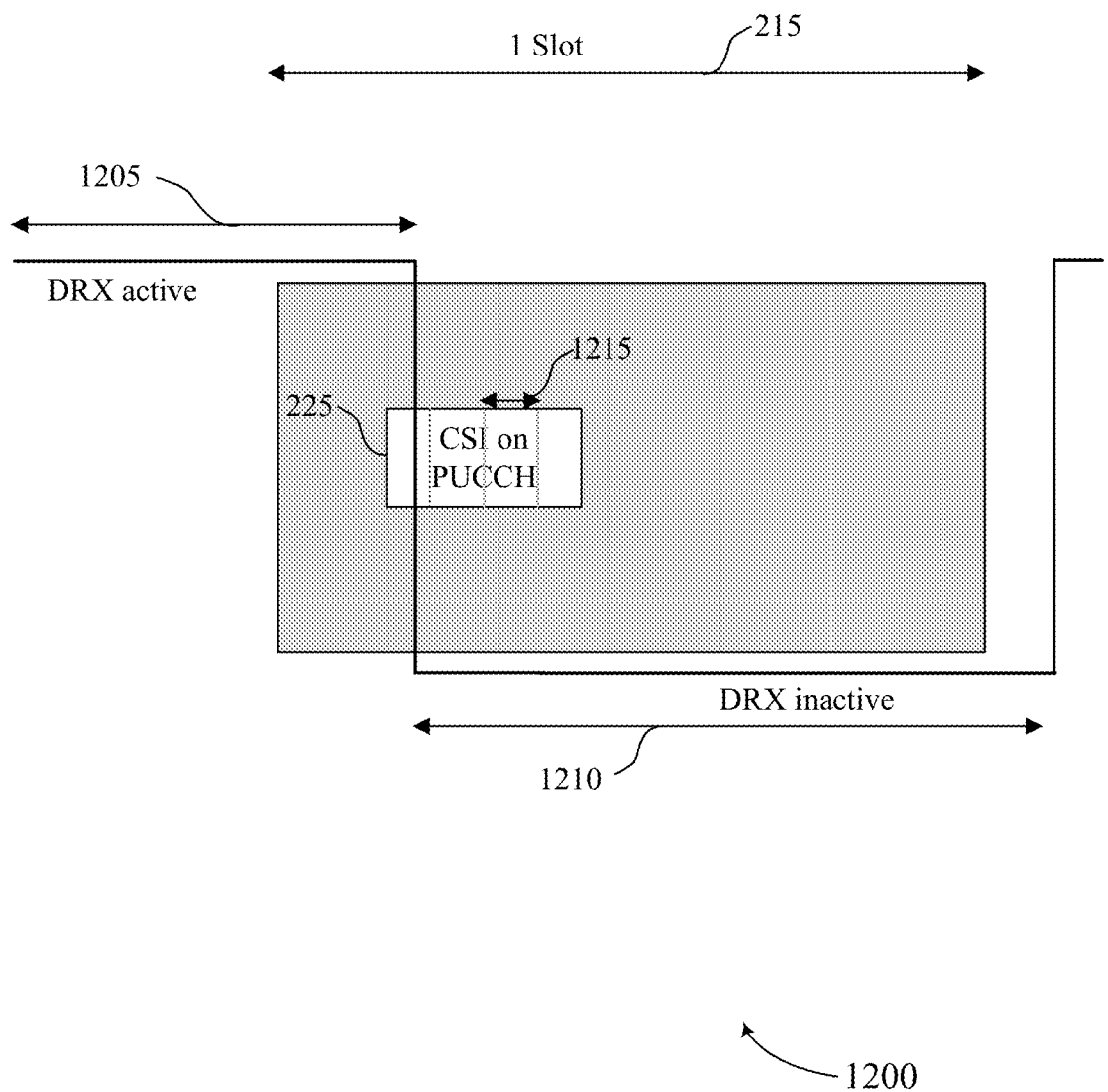
FIG. 12 illustrates an example of a DRX timing that supports dropping channel state information during discontinuous reception in accordance with aspects of the present disclosure.

FIG. 12 illustrates an example of a DRX timing 1200 that supports dropping channel state information during discontinuous reception in accordance with one or more aspects of the present disclosure.

In some examples, the PUCCH resources 225 may include multiple symbols 1215, such as OFDM symbols. Each symbol may include multiple chips. A chip, in some examples, may be the smallest unit of time in an NR wireless communication system, and may be referred to as Tc. In the DRX timing 1200, the UE may transition from the active DRX duration 1205 to the inactive DRX duration 1210 during the starting symbol of the PUCCH resources 225. In some examples, the UE may determine whether to drop a transmission of CSI based on a starting chip of one or more symbols rather than based on one or more symbols. That is, the UE may determine whether to drop transmission of the CSI at a finer level of granularity than at the symbol level. For example, the UE may determine whether to drop a transmission of CSI based on the starting chip of the starting symbol rather than based on the entire starting symbol. In some examples, the UE may determine whether to drop a transmission of CSI based on the starting chip of one or more other symbols, such as based on the starting chip of an ending symbol or based on the starting chips of one or more other symbols. For example, the UE may drop a configured CSI transmission if the UE determines that a quantity of the starting chips of symbols within an inactive DRX duration satisfies a threshold, such as a majority of the starting chips of the of the PUCCH resources allocated for the CSI. That is, if the quantity of starting chips of the PUCCH resources that are within an inactive DRX duration is greater than (or greater than or equal to) a quantity of starting chips of the PUCCH resources that are within an active DRX duration, the UE may determine to drop the transmission of the CSI.

Figure 13:
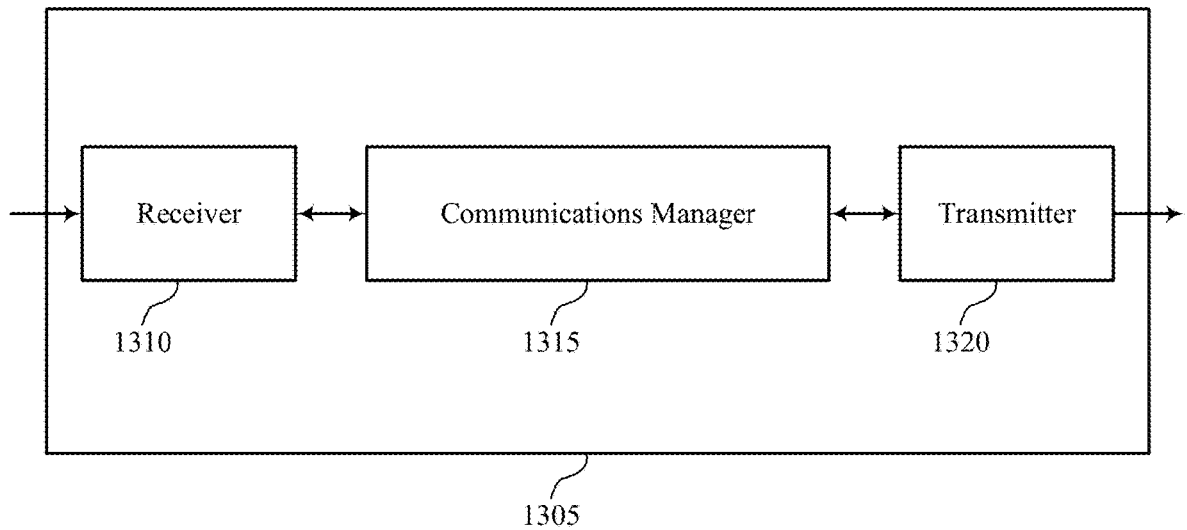
FIGS. 13 and 14 show block diagrams of devices that support dropping channel state information during discontinuous reception in accordance with aspects of the present disclosure.

FIG. 13 shows a block diagram of a device 1305 that supports dropping channel state information during discontinuous reception in accordance with aspects of the present disclosure. The device 1305 may be an example of aspects of a UE 115 as described herein. The device 1305 may include a receiver 1310, a communications manager 1315, and a transmitter 1320. The device 1305 can be implemented, at least in part, by one or both of a modem and a processor. Each of these components may be in communication with one another (for example, via one or more buses).

The receiver 1310 may receive information such as packets, user data, or control information associated with various information channels (for example, control channels, data channels, and information related to dropping channel state information during discontinuous reception). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive an indication of first resources associated with a PUCCH for transmitting CSI in a slot to a base station and determine whether one or more symbols of the first resources associated with the PUCCH in the slot are included in a portion of the slot within an inactive discontinuous reception duration for the UE. The communications manager 1315 may determine CSI and drop a configured transmission of the CSI in the slot based at least in part on determining that the one or more symbols of the first resources associated with the PUCCH in the slot are included in the portion of the slot including the inactive discontinuous reception duration for the UE.

The communications manager 1315 may also receive an indication of third resources of the physical uplink control channel for transmitting the channel state information in the slot.

The communications manager 1315 may also determine first resources associated with a PUCCH for transmitting CSI and an acknowledgment associated with a signal received by the UE in a slot to a base station, and select, based on determining the first resources, second resources associated with the PUCCH in the slot for transmitting the CSI and the acknowledgement. The communications manager 1315 may determine that the second resources associated with the PUCCH overlap with third resources associated with a PUSCH, determine, based on determining that the second resources associated with the PUCCH overlap with the third resources associated with the PUSCH, whether one or more symbols of the second resources associated with the PUCCH in the slot are included in a portion of the slot within an inactive discontinuous reception duration for the UE. The communications manager 1315 may select fourth resources for transmitting the acknowledgement based on determining whether the one or more symbols of the second resources associated with the PUCCH in the slot are included in the portion of the slot within the inactive discontinuous reception duration for the UE, the fourth resources including the second resources or the third resources, multiplex, over the fourth resources, the acknowledgement with data for transmitting on the PUSCH, and transmit, to the base station, the multiplexed acknowledgement and data using the fourth resources.

The communications manager 1315 may also multiplex CSI over first resources of a PUSCH for transmitting data to a base station in a slot based on determining that second resources of a PUCCH for transmitting the CSI overlap with the first resources, and determine whether additional information is multiplexed on the PUSCH based on determining that at least the portion of the slot includes the inactive discontinuous reception duration for the UE. The communications manager 1315 may select the first resources based at least in part on the indication of the third resources. The communications manager 1315 may determine whether at least a portion of the slot includes an inactive discontinuous reception duration for the UE. The communications manager 1315 may determine whether at least a portion of the slot includes the inactive discontinuous reception duration by determining whether a first symbol of the first resources is configured to be transmitted during the inactive discontinuous reception period. The communications manager 1315 may transmit the multiplexed CSI and the additional information on the first resources of the PUSCH based on determining that the CSI is multiplexed with the additional information. The communications manager 1315 may be an example of aspects of the communications manager 1610 described herein.

The transmitter 1320 may transmit signals generated by other components of the device 1305. In some examples, the transmitter 1320 may be collocated with a receiver 1310 in a transceiver component. For example, the transmitter 1320 may be an example of aspects of the transceiver 1620 described with reference to FIG. 16. The transmitter 1320 may utilize a single antenna or a set of antennas.

Figure 14:
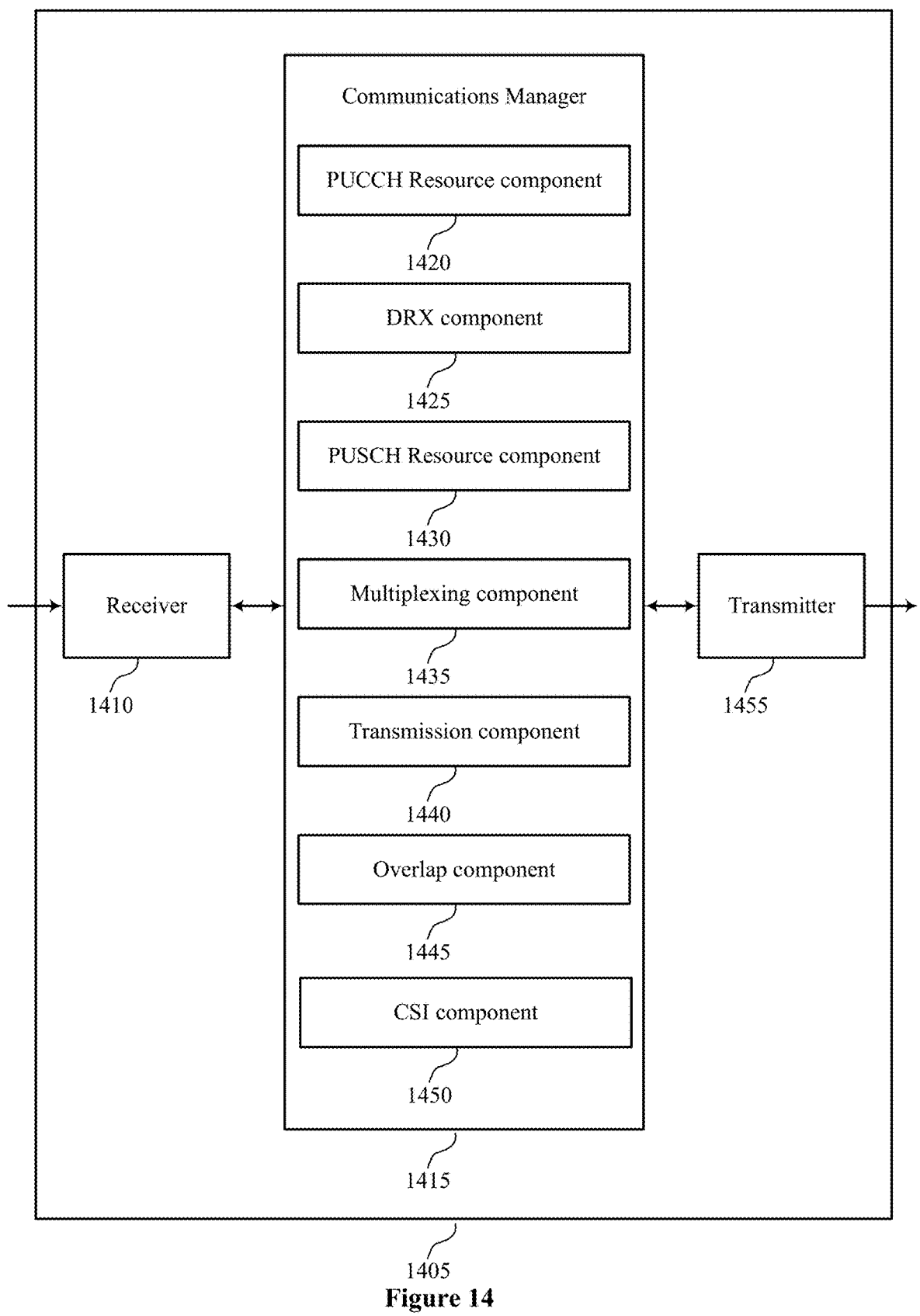

FIG. 14 shows a block diagram of a device 1405 that supports dropping channel state information during discontinuous reception in accordance with aspects of the present disclosure. The device 1405 may be an example of aspects of a device 1305, or a UE 115 as described herein. The device 1405 may include a receiver 1410, a communications manager 1415, and a transmitter 1450. The device 1405 can be implemented, at least in part, by one or both of a modem and a processor. Each of these components may be in communication with one another (for example, via one or more buses).

The receiver 1410 may receive information such as packets, user data, or control information associated with various information channels (for example, control channels, data channels, and information related to dropping channel state information during discontinuous reception). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a PUCCH resource component 1420, a DRX component 1425, a PUSCH resource component 1430, a multiplexing component 1435, a transmission component 1440, an overlap component 1445, and a CSI component 1450.

The PUCCH resource component 1420 may receive an indication of first resources associated with a PUCCH for transmitting CSI in a slot to a base station. The PUCCH resource component 1420 may determine first resources associated with a PUCCH for transmitting CSI and an acknowledgment associated with a signal received by the UE in a slot to a base station and select, based on determining the first resources, second resources associated with the PUCCH in the slot for transmitting the CSI and the acknowledgement.

The PUCCH resource component 1420 may receive an indication of third resources associated with a PUCCH for transmitting CSI in a slot to a base station.

The DRX component 1425 may determine whether one or more symbols of the first resources associated with the PUCCH in the slot are included in a portion of the slot within an inactive discontinuous reception duration for the UE. The DRX component 1425 may determine, based on determining that the second resources associated with the PUCCH overlap with the third resources associated with the PUSCH, whether one or more symbols of the second resources associated with the PUCCH in the slot are included in a portion of the slot within an inactive discontinuous reception duration for the UE. The DRX component 1425 may determine whether at least a portion of the slot includes an inactive discontinuous reception duration for the UE. The DRX component 1425 may determine whether at least a portion of the slot includes an inactive discontinuous reception duration by determining whether a first symbol of the first resources is configured to be transmitted during the inactive discontinuous reception duration.

The PUSCH resource component 1430 may determine second resources for a PUSCH. The PUSCH resources component 1430 may select first resources of a physical uplink shared channel based on the indication of the third resources.

The multiplexing component 1435 may multiplex the acknowledgement over second resources of the PUSCH before transmitting the acknowledgement to the base station. The multiplexing component 1435 may select fourth resources for transmitting the acknowledgement based on determining whether the one or more symbols of the second resources associated with the PUCCH in the slot are included in the portion of the slot within the inactive discontinuous reception duration for the UE, the fourth resources including the second resources or the third resources and multiplex, over the fourth resources, the acknowledgement with data for transmitting on the PUSCH. The multiplexing component 1435 may multiplex CSI over first resources of a PUSCH for transmitting data to a base station in a slot based on determining that second resources of a PUCCH for transmitting the CSI overlap with the first resources and determine whether additional information is multiplexed on the PUSCH based on determining that at least the portion of the slot includes the inactive discontinuous reception duration for the UE.

The transmission component 1440 may transmit, to the base station and in the slot, an acknowledgement associated with a signal received by the UE. The transmission component 1440 may transmit, to the base station, the multiplexed acknowledgement and data using the fourth resources. The transmission component 1440 may transmit the multiplexed CSI and the additional information on the first resources of the PUSCH based on determining that the CSI is multiplexed with the additional information.

The overlap component 1445 may determine that the second resources associated with the PUCCH overlap with third resources associated with a PUSCH.

The CSI component 1450 may determine CSI.

The transmitter 1455 may transmit signals generated by other components of the device 1405. In some examples, the transmitter 1455 may be collocated with a receiver 1410 in a transceiver component. For example, the transmitter 1455 may be an example of aspects of the transceiver 1620 described with reference to FIG. 16. The transmitter 1455 may utilize a single antenna or a set of antennas.

Figure 15:
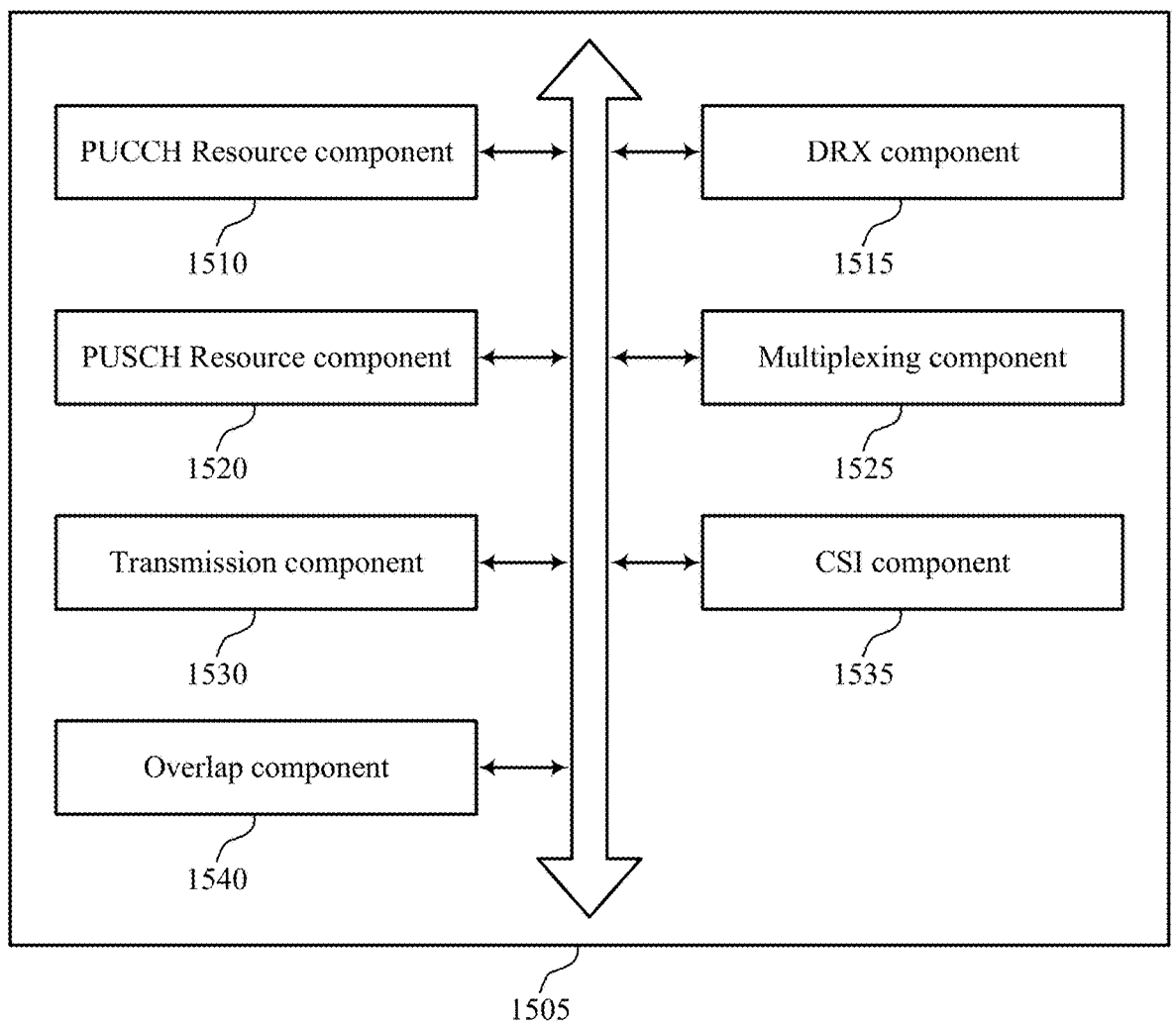
FIG. 15 shows a block diagram of a communications manager that supports dropping channel state information during discontinuous reception in accordance with aspects of the present disclosure.

FIG. 15 shows a block diagram of a communications manager 1505 that supports dropping channel state information during discontinuous reception in accordance with aspects of the present disclosure. The communications manager 1505 may include a PUCCH resource component 1510, a DRX component 1515, a PUSCH resource component 1520, a multiplexing component 1525, a transmission component 1530, a CSI component 1535, and an overlap component 1540. Each of these components may communicate, directly or indirectly, with one another (for example, via one or more buses).

The PUCCH resource component 1510 may receive an indication of first resources associated with a PUCCH for transmitting CSI in a slot to a base station. In some examples, the PUCCH resource component 1510 may determine first resources associated with a PUCCH for transmitting CSI and an acknowledgment associated with a signal received by the UE in a slot to a base station.

In some examples, the PUCCH resource component 1510 may select, based on determining the first resources, second resources associated with the PUCCH in the slot for transmitting the CSI and the acknowledgement. In some examples, the PUCCH resource component 1510 may receive, at the UE, an indication of the first resources. In some examples, the indication of the first resources is received via radio resource control signaling.

The DRX component 1515 may determine whether one or more symbols of the first resources associated with the PUCCH in the slot are included in a portion of the slot within an inactive DRX duration for the UE. In some examples, the DRX component 1515 may determine, based on determining that the second resources associated with the PUCCH overlap with the third resources associated with the PUSCH, whether one or more symbols of the second resources associated with the PUCCH in the slot are included in a portion of the slot within an inactive DRX duration for the UE.

In some examples, determining whether the one or more symbols of the first resources associated with the PUCCH in the slot are included in the portion of the slot including the inactive DRX duration for the UE includes determining whether a starting symbol of the first resources is included in the portion of the slot including the inactive DRX duration for the UE. In some examples, determining whether the one or more symbols of the first resources associated with the PUCCH in the slot are included in the portion of the slot including the inactive DRX duration for the UE includes determining whether a starting chip of each of the one or more starting symbols of the first resources is included in the portion of the slot comprising the inactive DRX duration for the UE.

In some examples, determining whether the one or more symbols of the first resources associated with the PUCCH in the slot are included in the portion of the slot including the inactive DRX duration for the UE includes determining whether an ending symbol of the first resources is included in the portion of the slot including the inactive DRX duration for the UE. In some examples, determining whether the one or more symbols of the first resources associated with the PUCCH in the slot are included in the portion of the slot including the inactive DRX duration for the UE includes determining whether a first quantity of symbols of the first resources are included in the portion of the slot including the inactive DRX duration for the UE and a second quantity of symbols of the first resources are included in a second portion of the slot including an active DRX duration for the UE, the method further including determining whether the first quantity of symbols is larger than the second quantity of symbols.

In some examples, determining whether the one or more symbols of the first resources associated with the PUCCH in the slot are included in the portion of the slot including the inactive DRX duration for the UE includes determining whether one or more symbols of the first resources associated with the PUCCH in the slot are included in the portion of the slot including the inactive DRX duration for the UE based on a logical transmission time of the slot.

In some examples, the DRX component 1515 may determine a physical transmission time of the slot based on a timing adjustment of the slot. In some examples, the DRX component 1515 may determine whether one or more symbols of the first resources associated with the PUCCH in the slot are included in the portion of the slot including the inactive DRX duration for the UE based on the physical transmission time of the slot. In some examples, determining that one or more symbols of the second resources are included in the portion of the slot includes determining that one or more symbols of the second resources are included in the portion of the slot that includes the inactive DRX duration for the UE based on a logical transmission time of the slot.

In some implementations, the DRX component 1515 may determine a physical transmission time of the slot based on a timing adjustment of the slot. In some examples, determining that one or more symbols of the second resources are included in the portion of the slot includes determining that one or more symbols of the second resources are included in the portion of the slot that includes the inactive DRX duration for the UE based on the physical transmission time of the slot.

The PUSCH resource component 1520 may determine second resources on a PUSCH.

The multiplexing component 1525 may multiplex, over the second resources and based on determining whether one or more symbols of the first resources are included in the portion of the slot, an acknowledgement associated with a signal received by the UE.

In some examples, the multiplexing component 1525 may select fourth resources for transmitting the acknowledgement based on determining whether the one or more symbols of the second resources associated with the PUCCH in the slot are included in the portion of the slot within the inactive DRX duration for the UE, the fourth resources including the second resources or the third resources.

In some examples, the multiplexing component 1525 may multiplex, over the fourth resources, the acknowledgement with data for transmitting on the PUSCH. In some examples, the multiplexing component 1525 may multiplex CSI over first resources of a PUSCH for transmitting data to a base station in a slot based on determining that second resources of a PUCCH for transmitting the CSI overlap with the first resources. In some examples, determining whether additional information is multiplexed on the PUSCH is based on determining that at least the portion of the slot includes the inactive DRX duration for the UE.

In some examples, the multiplexing component 1525 may multiplex the acknowledgement associated with the signal received by the UE is based on determining that the first resources and the third resources overlap with the second resources. In some examples, multiplexing the acknowledgement includes multiplexing the acknowledgement with the CSI over the second resources for transmitting on the PUSCH based on determining that the one or more symbols of the first resources associated with the PUCCH in the slot are included in a second portion of the slot including an active DRX duration for the UE.

In some examples, multiplexing, over the second resources and based on determining whether one or more symbols of the first resources are included in the portion of the slot, includes multiplexing over the second resources and after determining whether one or more symbols of the first resources are included in the portion of the slot. In some examples, selecting the second resources or the third resources as the fourth resources includes selecting the third resources as the fourth resources based on determining that the one or more symbols of the second resources associated with the PUCCH in the slot are included in the portion of the slot within the inactive DRX duration for the UE.

In some examples, the multiplexing component 1525 may multiplex the CSI with the acknowledgement over the fourth resources.

The transmission component 1530 may transmit, to the base station, the multiplexed acknowledgement on the PUSCH using the second resources. In some examples, the transmission component 1530 may transmit, to the base station, the multiplexed acknowledgement and data using the fourth resources. In some examples, the transmission component 1530 may transmit the multiplexed CSI and the additional information on the first resources of the PUSCH based on determining that the CSI is multiplexed with the additional information. In some examples, transmitting the multiplexed acknowledgement on the PUSCH using the second resources includes transmitting the acknowledgement in the slot. In some examples, transmitting to the base station includes transmitting the multiplexed CSI and the multiplexed acknowledgement on the PUSCH using the second resources. In some examples, transmitting the acknowledgement using the fourth resources includes transmitting the acknowledgement on the PUSCH using the fourth resources. In some examples, transmitting to the base station includes transmitting the multiplexed CSI with the multiplexed acknowledgement on the PUCCH using the fourth resources.

In some examples, the transmission component 1530 may transmit a second signal on the PUSCH time-division multiplexed with the multiplexed CSI and multiplexed acknowledgement on the PUCCH. In some examples, the transmission component 1530 may refrain from transmitting the multiplexed CSI over the slot based on determining that the CSI is not multiplexed with the additional information. In some examples, transmitting the multiplexed CSI on the first resources of the PUSCH based on determining that the at least the portion of the slot includes an active DRX duration for the UE. In some examples, the additional information includes first data to be transmitted by the UE, an acknowledgement of a signal received by the UE, or a combination thereof.

The overlap component 1540 may determine that the second resources associated with the PUCCH overlap with third resources associated with a PUSCH. In some examples, the overlap component 1540 may determine that the first resources for transmitting the CSI and third resources for transmitting the acknowledgement on the PUCCH overlap with the second resources. In some examples, the overlap component 1540 may determine the first resources is based on determining that the first resources overlap with the other resources.

The CSI component 1535 may determine CSI. In some examples, the CSI component 1535 may drop a configured transmission of the CSI in the slot based on determining that the one or more symbols of the first resources associated with the PUCCH in the slot are included in the portion of the slot including the inactive DRX duration for the UE. In some examples, dropping the configured transmission of the CSI includes excluding the CSI from being multiplexed over the second resources of the PUSCH.

In some examples, the CSI component 1535 may drop a configured transmission of the CSI based on determining that the one or more symbols of the second resources associated with the PUCCH in the slot are included in the portion of the slot within the inactive DRX duration for the UE. In some examples, the CSI component 1535 may drop one or more additional configured transmissions of the CSI based on determining that the one or more symbols of the second resources are included in the portion of the slot that includes the inactive DRX duration for the UE.

In some examples, the CSI includes periodic CSI or semi-persistent CSI.

Figure 16:
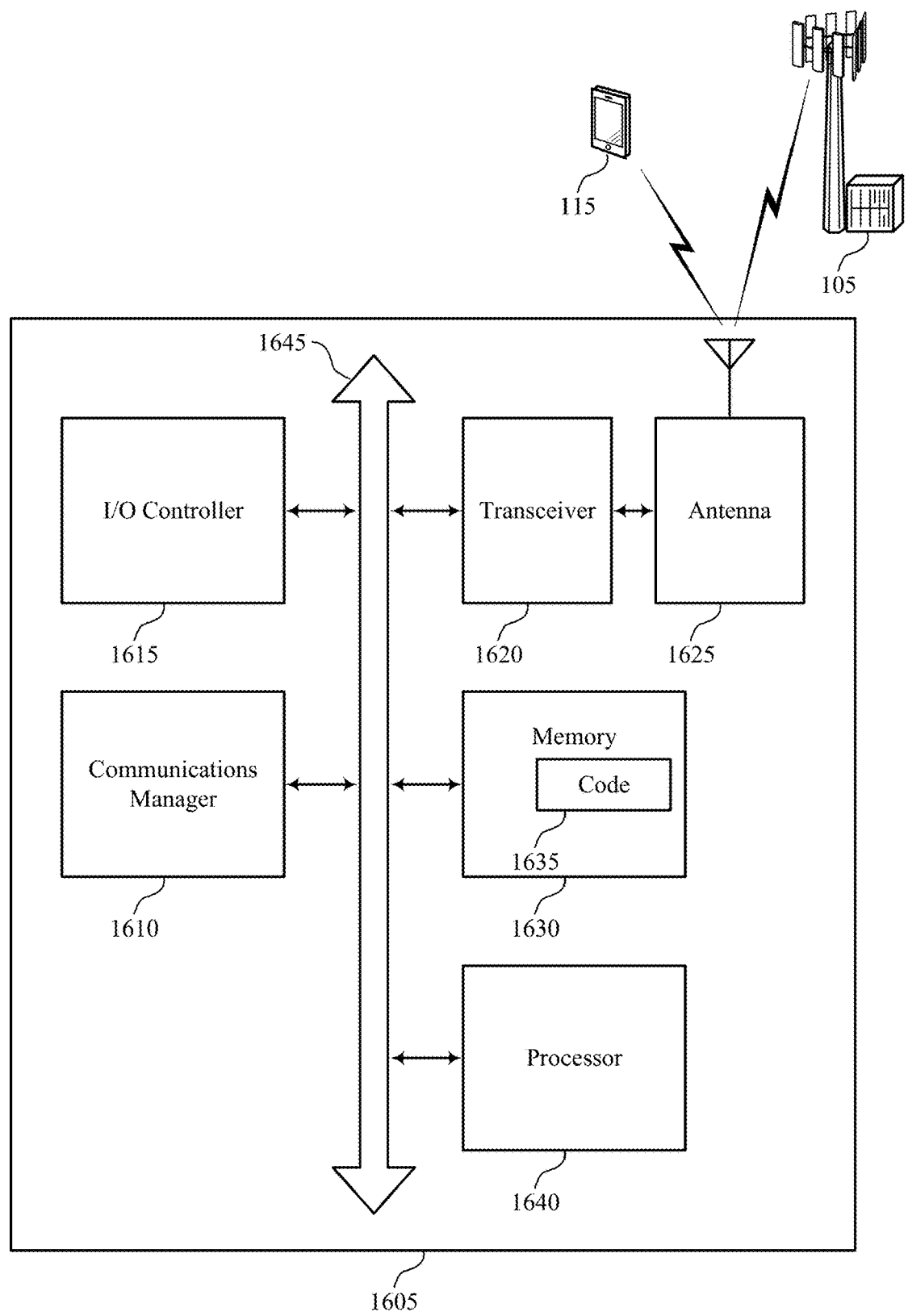
FIG. 16 shows a diagram of a system including a device that supports dropping channel state information during discontinuous reception in accordance with aspects of the present disclosure.

FIG. 16 shows a diagram of a system including a device 1605 that supports dropping channel state information during discontinuous reception in accordance with aspects of the present disclosure. The device 1605 may be an example of or include the components of device 1305, device 1405, or a UE 115 as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (for example, bus 1645).

The communications manager 1610 may receive an indication of first resources associated with a PUCCH for transmitting CSI in a slot to a base station, determine whether one or more symbols of the first resources associated with the PUCCH in the slot are included in a portion of the slot within an inactive DRX duration for the UE, determine second resources for transmitting data on a PUSCH, multiplex, over the second resources and based on determining whether one or more symbols of the first resources are included in the portion of the slot, an acknowledgement associated with a signal received by the UE with the data, and transmit, to the base station, the multiplexed acknowledgement on the PUSCH using the second resources.

The communications manager 1610 may also determine first resources associated with a PUCCH for transmitting CSI and an acknowledgment associated with a signal received by the UE in a slot to a base station, select, based on determining the first resources, second resources associated with the PUCCH in the slot for transmitting the CSI and the acknowledgement, determine that the second resources associated with the PUCCH overlap with third resources associated with a PUSCH, determine, based on determining that the second resources associated with the PUCCH overlap with the third resources associated with the PUSCH, whether one or more symbols of the second resources associated with the PUCCH in the slot are included in a portion of the slot within an inactive DRX duration for the UE, select fourth resources for transmitting the acknowledgement based on determining whether the one or more symbols of the second resources associated with the PUCCH in the slot are included in the portion of the slot within the inactive DRX duration for the UE, the fourth resources including the second resources or the third resources, multiplex, over the fourth resources, the acknowledgement with data for transmitting on the PUSCH, and transmit, to the base station, the multiplexed acknowledgement and data using the fourth resources.

The communications manager 1610 may also multiplex CSI over first resources of a PUSCH for transmitting data to a base station in a slot based on determining that second resources of a PUCCH for transmitting the CSI overlap with the first resources, determine whether additional information is multiplexed on the PUSCH based on determining that at least the portion of the slot includes the inactive DRX duration for the UE, determine that at least a portion of the slot includes an inactive DRX duration for the UE, and transmit the multiplexed CSI and the additional information on the first resources of the PUSCH based on determining that the CSI is multiplexed with the additional information.

The I/O controller 1615 may manage input and output signals for the device 1605. The I/O controller 1615 may also manage peripherals not integrated into the device 1605. In some examples, the I/O controller 1615 may represent a physical connection or port to an external peripheral. In some examples, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some examples, the I/O controller 1615 may be implemented as part of a processor. In some examples, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some examples, the wireless device may include a single antenna 1625. However, in some examples the device may have more than one antenna 1625, which may be capable of concurrently transmitting or receiving multiple wireless transmissions.

The memory 1630 may include RAM and ROM. The memory 1630 may store computer-readable, computer-executable code 1635 including instructions that, when executed, cause the processor to perform various functions described herein. In some examples, the memory 1630 may contain, among other things, a BIOS which may control basic hardware or software operation such as the interaction with peripheral components or devices.

The processor 1640 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1640 may be configured to operate a memory array using a memory controller. In other cases, a memory controller may be integrated into the processor 1640. The processor 1640 may be configured to execute computer-readable instructions stored in a memory (for example, the memory 1630) to cause the device 1605 to perform various functions (for example, functions or tasks supporting dropping CSI during DRX).

The code 1635 may include instructions to implement aspects of the present disclosure, including instructions to support wireless communications. The code 1635 may be stored in a non-transitory computer-readable medium such as system memory or other type of memory. In some examples, the code 1635 may not be directly executable by the processor 1640 but may cause a computer (for example, when compiled and executed) to perform functions described herein.

Figure 17:
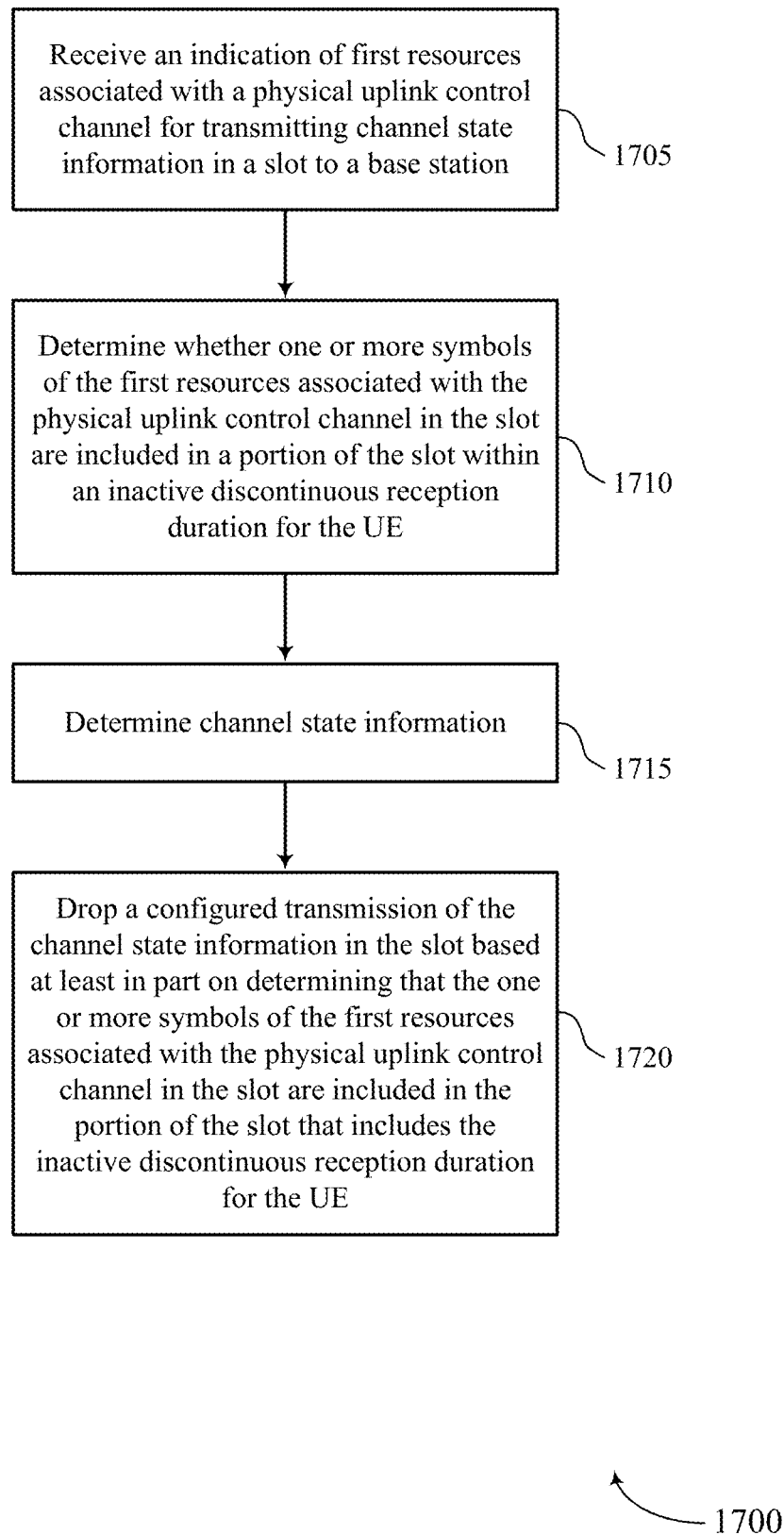
FIGS. 17-19 show flowcharts illustrating methods that support dropping channel state information during discontinuous reception in accordance with aspects of the present disclosure.

FIG. 17 shows a flowchart illustrating a method 1700 that supports dropping channel state information during discontinuous reception in accordance with aspects of the present disclosure. The operations of method 1700 may be implemented by a UE 115 or its components as described herein. For example, the operations of method 1700 may be performed by a communications manager as described with reference to FIGS. 13-16. In some examples, a UE may execute a set of instructions to control the functional elements of the UE to perform the functions described below. Additionally or alternatively, a UE may perform aspects of the functions described below using special-purpose hardware.

At 1705, the UE may receive an indication of first resources associated with a PUCCH for transmitting CSI in a slot to a base station. The operations of 1705 may be performed according to the methods described herein. In some examples, aspects of the operations of 1705 may be performed by a PUCCH resource component as described with reference to FIGS. 13-16.

At 1710, the UE may determine whether one or more symbols of the first resources associated with the PUCCH in the slot are included in a portion of the slot within an inactive DRX duration for the UE. The operations of 1710 may be performed according to the methods described herein. In some examples, aspects of the operations of 1710 may be performed by a DRX component as described with reference to FIGS. 13-16.

At 1715, the UE may determine CSI. The operations of 1715 may be performed according to the methods described herein. In some examples, aspects of the operations of 1715 may be performed by a CSI component as described with reference to FIGS. 13-16.

At 1720, the UE may drop a configured transmission of the CSI in the slot based at least in part on determining that the one or more symbols of the first resources associated with the PUCCH in the slot are included in the portion of the slot that includes the inactive DRX duration for the UE. The operations of 1720 may be performed according to the methods described herein. In some examples, aspects of the operations of 1720 may be performed by a DRX component as described with reference to FIGS. 13-16.

In some examples, the UE may identify second resources on the PUSCH and transmit, to the base station, the multiplexed acknowledgement on the PUSCH using the second resources.

Figure 18:
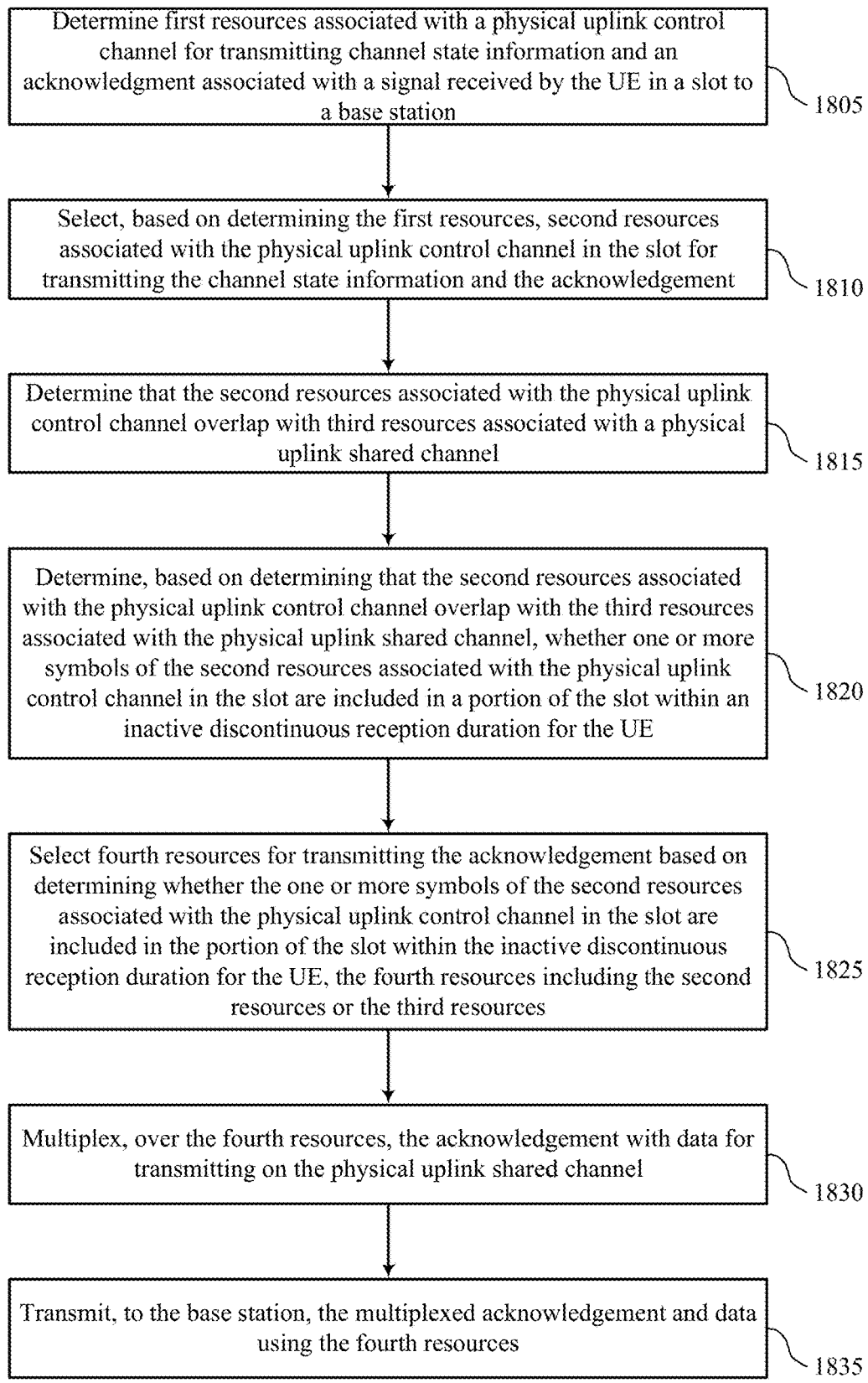

FIG. 18 shows a flowchart illustrating a method 1800 that supports dropping channel state information during discontinuous reception in accordance with aspects of the present disclosure. The operations of method 1800 may be implemented by a UE 115 or its components as described herein. For example, the operations of method 1800 may be performed by a communications manager as described with reference to FIGS. 13-16. In some examples, a UE may execute a set of instructions to control the functional elements of the UE to perform the functions described below. Additionally or alternatively, a UE may perform aspects of the functions described below using special-purpose hardware.

At 1805, the UE may determine first resources associated with a PUCCH for transmitting CSI and an acknowledgment associated with a signal received by the UE in a slot to a base station. The operations of 1805 may be performed according to the methods described herein. In some examples, aspects of the operations of 1805 may be performed by a PUCCH resource component as described with reference to FIGS. 13-16.

At 1810, the UE may select, based on determining the first resources, second resources associated with the PUCCH in the slot for transmitting the CSI and the acknowledgement. The operations of 1810 may be performed according to the methods described herein. In some examples, aspects of the operations of 1810 may be performed by a PUCCH resource component as described with reference to FIGS. 13-16.

At 1815, the UE may determine that the second resources associated with the PUCCH overlap with third resources associated with a PUSCH. The operations of 1815 may be performed according to the methods described herein. In some examples, aspects of the operations of 1815 may be performed by an overlap component as described with reference to FIGS. 13-16.

At 1820, the UE may determine, based on determining that the second resources associated with the PUCCH overlap with the third resources associated with the PUSCH, whether one or more symbols of the second resources associated with the PUCCH in the slot are included in a portion of the slot within an inactive DRX duration for the UE. The operations of 1820 may be performed according to the methods described herein. In some examples, aspects of the operations of 1820 may be performed by a DRX component as described with reference to FIGS. 13-16.

At 1825, the UE may select fourth resources for transmitting the acknowledgement based on determining whether the one or more symbols of the second resources associated with the PUCCH in the slot are included in the portion of the slot within the inactive DRX duration for the UE, the fourth resources including the second resources or the third resources. The operations of 1825 may be performed according to the methods described herein. In some examples, aspects of the operations of 1825 may be performed by a multiplexing component as described with reference to FIGS. 13-16.

At 1830, the UE may multiplex, over the fourth resources, the acknowledgement with data for transmitting on the PUSCH. The operations of 1830 may be performed according to the methods described herein. In some examples, aspects of the operations of 1830 may be performed by a multiplexing component as described with reference to FIGS. 13-16.

At 1835, the UE may transmit, to the base station, the multiplexed acknowledgement and data using the fourth resources. The operations of 1835 may be performed according to the methods described herein. In some examples, aspects of the operations of 1835 may be performed by a transmission component as described with reference to FIGS. 13-16.

Figure 19:
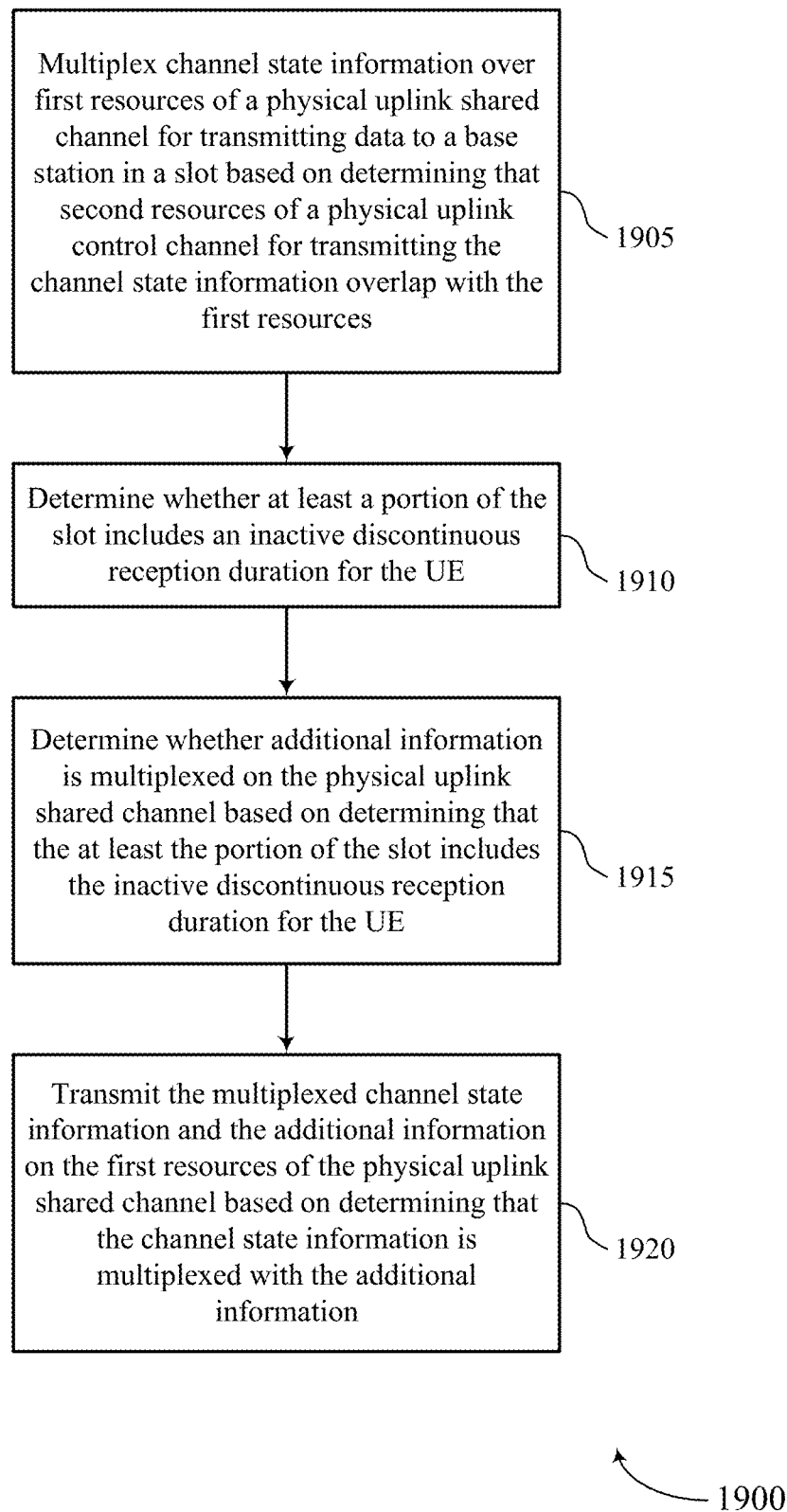

FIG. 19 shows a flowchart illustrating a method 1900 that supports dropping channel state information during discontinuous reception in accordance with aspects of the present disclosure. The operations of method 1900 may be implemented by a UE 115 or its components as described herein. For example, the operations of method 1900 may be performed by a communications manager as described with reference to FIGS. 13-16. In some examples, a UE may execute a set of instructions to control the functional elements of the UE to perform the functions described below. Additionally or alternatively, a UE may perform aspects of the functions described below using special-purpose hardware.

At 1905, the UE may multiplex CSI over first resources of a PUSCH for transmitting data to a base station in a slot based on determining that second resources of a PUCCH for transmitting the CSI overlap with the first resources. The operations of 1905 may be performed according to the methods described herein. In some examples, aspects of the operations of 1905 may be performed by a multiplexing component as described with reference to FIGS. 13-16.

At 1910, the UE may determine whether at least a portion of the slot includes an inactive DRX duration for the UE. The operations of 1910 may be performed according to the methods described herein. In some examples, aspects of the operations of 1910 may be performed by a DRX component as described with reference to FIGS. 13-16.

At 1915, the UE may determine whether additional information is multiplexed on the PUSCH based on determining that the at least the portion of the slot includes the inactive DRX duration for the UE. The operations of 1915 may be performed according to the methods described herein. In some examples, aspects of the operations of 1915 may be performed by a multiplexing component as described with reference to FIGS. 13-16.

At 1920, the UE may transmit the multiplexed CSI and the additional information on the first resources of the PUSCH based on determining that the CSI is multiplexed with the additional information. The operations of 1920 may be performed according to the methods described herein. In some examples, aspects of the operations of 1920 may be performed by a transmission component as described with reference to FIGS. 13-16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (such as, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   multiplexing channel state information over first resources of a physical uplink shared channel for transmitting data to a base station in a slot based at least in part on determining that second resources of a physical uplink control channel for transmitting the channel state information overlap with the first resources;
   determining whether at least a portion of the slot comprises an inactive discontinuous reception duration for the UE;
   determining whether additional information is multiplexed on the physical uplink shared channel based at least in part on determining that at least the portion of the slot comprises the inactive discontinuous reception duration for the UE; and
   transmitting the multiplexed channel state information and the additional information on the first resources of the physical uplink shared channel based at least in part on determining that the channel state information is multiplexed with the additional information.

2. The method of claim 1, wherein determining whether at least the portion of the slot comprises the inactive discontinuous reception duration for the UE comprises determining whether a first symbol of the first resources is configured to be transmitted during the inactive discontinuous reception duration.

3. The method of claim 1, further comprising receiving, from the base station, an indication of third resources of the physical uplink control channel for transmitting the channel state information in the slot, wherein multiplexing the channel state information over the first resources comprises selecting the first resources based at least in part on the indication of the third resources.

4. The method of claim 1, further comprising refraining from transmitting the multiplexed channel state information in the slot based at least in part on determining that the channel state information is not multiplexed with the additional information.

5. The method of claim 1, wherein the additional information comprises first data to be transmitted by the UE, an acknowledgement of a signal received by the UE, or a combination thereof.

6. The method of claim 1, further comprising:
transmitting the multiplexed channel state information on the first resources of the physical uplink shared channel based at least in part on determining that the at least the portion of the slot comprises an active discontinuous reception duration for the UE.

7. A method for wireless communications at a user equipment (UE), comprising:
receiving an indication of first resources associated with a physical uplink control channel for transmitting channel state information in a slot to a base station;
determining whether one or more symbols of the first resources are included in a portion of the slot that is within an inactive discontinuous reception duration for the UE;
determining the channel state information;
dropping a configured transmission of the channel state information in the slot based at least in part on determining that the one or more symbols of the first resources associated with the physical uplink control channel in the slot are included in the portion of the slot comprising the inactive discontinuous reception duration for the UE; and
dropping one or more additional configured transmissions of the channel state information based at least in part on determining that the one or more symbols of the first resources are included in the portion of the slot that comprises the inactive discontinuous reception duration for the UE.

8. The method of claim 7, further comprising transmitting, to the base station on a physical uplink shared channel and in the slot, an acknowledgement associated with a signal received by the UE.

9. The method of claim 8, further comprising multiplexing the acknowledgement over second resources of the physical uplink shared channel before transmitting the acknowledgement to the base station.

10. The method of claim 9, wherein dropping the configured transmission of the channel state information comprises excluding the channel state information from being multiplexed over the second resources of the physical uplink shared channel.

11. The method of claim 9, further comprising determining that the first resources for transmitting the channel state information and third resources for transmitting the acknowledgement on the physical uplink control channel overlap with the second resources of the physical uplink shared channel, wherein multiplexing the acknowledgement is based at least in part on determining that the first resources and the third resources overlap with the second resources.

12. The method of claim 9, further comprising:
multiplexing the channel state information with the acknowledgement over the second resources for transmitting on the physical uplink shared channel based at least in part on determining that the one or more symbols of the first resources associated with the physical uplink control channel in the slot are included in a second portion of the slot comprising an active discontinuous reception duration for the UE, and
transmitting the channel state information multiplexed with the acknowledgement on the physical uplink shared channel using the second resources.

13. The method of claim 7, wherein determining whether the one or more symbols of the first resources associated with the physical uplink control channel in the slot are included in the portion of the slot comprising the inactive discontinuous reception duration for the UE comprises determining whether a starting symbol of the first resources is included in the portion of the slot comprising the inactive discontinuous reception duration for the UE.

14. The method of claim 7, wherein determining whether the one or more symbols of the first resources associated with the physical uplink control channel in the slot are included in the portion of the slot comprising the inactive discontinuous reception duration for the UE comprises determining whether a starting chip of each of the one or more symbols of the first resources is included in the portion of the slot comprising the inactive discontinuous reception duration for the UE.

15. The method of claim 7, wherein determining whether the one or more symbols of the first resources associated with the physical uplink control channel in the slot are included in the portion of the slot comprising the inactive discontinuous reception duration for the UE comprises determining whether an ending symbol of the first resources is included in the portion of the slot comprising the inactive discontinuous reception duration for the UE.

16. The method of claim 7, wherein determining whether the one or more symbols of the first resources associated with the physical uplink control channel in the slot are included in the portion of the slot comprises determining whether the one or more symbols of the first resources associated with the physical uplink control channel in the slot are included in the portion of the slot comprising the inactive discontinuous reception duration for the UE based at least in part on a logical transmission time of the slot.

17. The method of claim 7, wherein the channel state information comprises periodic channel state information or semi persistent channel state information.

18. The method of claim 7, wherein the indication of the first resources is received via radio resource control signaling.

19. A method for wireless communications at a user equipment (UE), comprising:
receiving an indication of first resources associated with a physical uplink control channel for transmitting channel state information in a slot to a base station;
determining whether one or more symbols of the first resources are included in a portion of the slot that is within an inactive discontinuous reception duration for the UE;
determining the channel state information; and
dropping a configured transmission of the channel state information in the slot based at least in part on determining that the one or more symbols of the first resources associated with the physical uplink control channel in the slot are included in the portion of the slot comprising the inactive discontinuous reception duration for the UE,
wherein determining whether the one or more symbols of the first resources associated with the physical uplink control channel in the slot are included in the portion of the slot comprises determining whether a first quantity of symbols of the first resources are included in the portion of the slot comprising the inactive discontinuous reception duration for the UE is larger than a second quantity of symbols of the first resources are included in a second portion of the slot comprising an active discontinuous reception duration for the UE.

20. A method for wireless communications at a user equipment (UE), comprising:

receiving an indication of first resources associated with a physical uplink control channel for transmitting channel state information in a slot to a base station;

determining whether one or more symbols of the first resources are included in a portion of the slot that is within an inactive discontinuous reception duration for the UE;

determining the channel state information; and dropping a configured transmission of the channel state information in the slot based at least in part on determining that the one or more symbols of the first resources associated with the physical uplink control channel in the slot are included in the portion of the slot comprising the inactive discontinuous reception duration for the UE.

wherein determining whether the one or more symbols of the first resources associated with the physical uplink control channel in the slot are included in the portion of the slot comprises:

determining a physical transmission time of the slot based at least in part on a timing adjustment of the slot; and determining whether the one or more symbols of the first resources associated with the physical uplink control channel in the slot are included in the portion of the slot comprising-the inactive discontinuous reception duration for the UE based at least in part on the physical transmission time of the slot.

21. An apparatus for wireless communications at a user equipment (UE), comprising:

a processor, memory coupled with the processor; and instructions stored in the memory and executable by the processor to cause the apparatus to:

multiplex channel state information over first resources of a physical uplink shared channel for transmitting data to a base station in a slot based at least in part on determining that second resources of a physical uplink control channel for transmitting the channel state information overlap with the first resources;

determine whether at least a portion of the slot comprises an inactive discontinuous reception duration for the UE;

determine whether additional information is multiplexed on the physical uplink shared channel based at least in part on determining that at least the portion of the slot comprises the inactive discontinuous reception duration for the UE; and transmit the multiplexed channel state information and the additional information on the first resources of the physical uplink shared channel based at least in part on determining that the channel state information is multiplexed with the additional information.

22. The apparatus of claim 21, wherein the instructions for determining whether at least the portion of the slot comprises an inactive discontinuous reception duration for the UE comprise instructions for determining whether a first symbol of the first resources is configured to be transmitted during the inactive discontinuous reception duration.

23. The apparatus of claim 21, wherein the instructions are further executable by the processor to cause the apparatus to receive, from the base station, an indication of third resources of the physical uplink control channel for transmitting the channel state information in the slot, wherein the instructions for multiplexing the channel state information over the first resources comprise instructions for selecting the first resources based at least in part on the indication of the third resources.

24. The apparatus of claim 21, wherein the instructions are further executable by the processor to cause the apparatus to refrain from transmitting the multiplexed channel state information over the slot based at least in part on determining that the channel state information is not multiplexed with the additional information.

25. The apparatus of claim 21, wherein the additional information comprises one or more of first data to be transmitted by the UE or an acknowledgement of a signal received by the UE.

26. An apparatus for wireless communications at a user equipment (UE), comprising:

a processor, memory coupled with the processor; and instructions stored in the memory and executable by the processor to cause the apparatus to:

receive an indication of first resources associated with a physical uplink control channel for transmitting channel state information in a slot to a base station;

determine whether one or more symbols of the first resources associated with the physical uplink control channel in the slot are included in a portion of the slot within an inactive discontinuous reception duration for the UE;

determine the channel state information;

drop a configured transmission of the channel state information in the slot based at least in part on determining that the one or more symbols of the first resources associated with the physical uplink control channel in the slot are included in the portion of the slot comprising the inactive discontinuous reception duration for the UE; and drop one or more additional configured transmissions of the channel state information based at least in part on determining that the one or more symbols of the first resources are included in the portion of the slot that comprises the inactive discontinuous reception duration for the UE.

27. The apparatus of claim 26, wherein the instructions are further executable by the processor to cause the apparatus to transmit, to the base station on a physical uplink shared channel and in the slot, an acknowledgement associated with a signal received by the UE.

28. The apparatus of claim 27, wherein the instructions are further executable by the processor to cause the apparatus to multiplex the acknowledgement over second resources of the physical uplink shared channel before transmitting the acknowledgement to the base station.

29. The apparatus of claim 28, wherein the instructions to drop the configured transmission of the channel state information cause the apparatus to exclude the channel state information from being multiplexed over the second resources of the physical uplink shared channel.

* * * * *